US012681127B2

(12) United States Patent
Ernström et al.

(10) Patent No.: US 12,681,127 B2
(45) Date of Patent: Jul. 14, 2026

(54) TEMPORAL AND FREQUENCY-DEPENDENT TIMING ERROR GROUPS

(71) Applicant: Telefonaktiebolaget LM Ericsson (publ), Stockholm (SE)

(72) Inventors: Per Ernström, Stockholm (SE); Siva Muruganathan, Stittsville (CA); Iana Siomina, Täby (SE); Ritesh Shreevastav, Upplands Väsby (SE); Fredrik Gunnarsson, Linköping (SE); Florent Munier, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 258 days.

(21) Appl. No.: 18/553,491

(22) PCT Filed: Mar. 31, 2022

(86) PCT No.: PCT/EP2022/058685
§ 371 (c)(1),
(2) Date: Sep. 29, 2023

(87) PCT Pub. No.: WO2022/207857
PCT Pub. Date: Oct. 6, 2022

(65) Prior Publication Data
US 2024/0183928 A1 Jun. 6, 2024

Related U.S. Application Data

(60) Provisional application No. 63/169,553, filed on Apr. 1, 2021.

(51) Int. Cl.
*G01S 5/02* (2010.01)

(52) U.S. Cl.
CPC ................................ *G01S 5/0244* (2020.05)

(58) Field of Classification Search
CPC ....................................................... G01S 5/0244
(Continued)

(56) References Cited

U.S. PATENT DOCUMENTS

| | | | | |
|---|---|---|---|---|
| 12,413,364 B2 * | 9/2025 | Huang | ................... | H04W 24/10 |
| 2020/0351814 A1 * | 11/2020 | Manolakos | ............... | G01S 5/14 |
| 2022/0322267 A1 * | 10/2022 | Bao | ........................ | G01S 5/0036 |

FOREIGN PATENT DOCUMENTS

| | | | | | |
|---|---|---|---|---|---|
| CN | 106680770 A | * | 5/2017 | ............... | G01S 5/12 |
| CN | 111880205 A | * | 11/2020 | ............. | G01S 19/42 |

(Continued)

OTHER PUBLICATIONS

International Search Report and Written Opinion of the International Searching Authority, PCT/EP2022/058685, mailed Jul. 25, 2022, 15 pages.

(Continued)

*Primary Examiner* — Harry K Liu
(74) *Attorney, Agent, or Firm* — Sage Patent Group

(57) ABSTRACT

Methods and apparatus are provided for determining timing error groups. In one embodiment a method of operating an entity in a communications network is provided. The communications network includes a network node. The method comprising determining at least one potential margin from a predetermined plurality of potential margins. Each potential margin of the plurality of potential margins being a potential maximum margin of timing error difference between two measurements based on positioning related reference signals or transmissions of positioning related reference signals. The method further comprising transmitting an indication of the at least one potential margin to the network node. The method includes determining a margin from the at least one potential margin and performing an action. The method (Continued)

further comprising determining a timing error group, TEG, associated with the action based on the margin.

19 Claims, 27 Drawing Sheets

(58) Field of Classification Search
USPC ......................................................... 342/450
See application file for complete search history.

(56) References Cited

FOREIGN PATENT DOCUMENTS

| | | | | | |
|---|---|---|---|---|---|
| CN | 113740801 | A | * | 12/2021 | ........... G01S 5/0221 |
| KR | 102161456 | B1 | * | 10/2020 | ......... G06Q 10/0631 |
| WO | 2020168253 | A1 | | 8/2020 | |
| WO | 2021229026 | A1 | | 11/2021 | |

OTHER PUBLICATIONS

3GPP TS 38.455 V16.2.0 (Jan. 2021), 3rd Generation Partnership Project; Technical Specification Group Radio Access Network; NG-RAN; NR Positioning Protocol A (NRPPa) (Release 16).
3GPP TSG RAN WG1 Meeting #104bis-e, R1210xxxx e-Meeting, Apr. 12-20, 2021, MCC Support, Draft Report of 3GPP Tsg Ran WG1 #104-e v0.3.0 (Online Meeting, Jan. 25-Feb. 5, 2021, XP051984849, 179 pages.

* cited by examiner

```
-- ASN1START

NR-Multi-RTT-ProvideAssistanceData-r16 ::= SEQUENCE (
    nr-DL-PRS-AssistanceData-r16          NR-DL-PRS-AssistanceData-r16    OPTIONAL,       -- Need ON
    nr-SelectedDL-PRS-IndexList-r16       NR-SelectedDL-PRS-IndexList-r16 OPTIONAL,       -- Need ON
    nr-Multi-RTT-Error-r16                NR-Multi-RTT-Error-r16          OPTIONAL,       -- Need ON
    ...,
    [[
    ue-rx-MarginForIncrementingGroupDelay-r17  ENUMERATED (ns0.25,ns0.50,ns0.75,ns1) OPTIONAL,  -- Need ON ue-tx-MarginForIncrementingGroupDelay-r17  ENUMERATED ( ns0.25,ns0.50,ns0.75,ns1) OPTIONAL  -- Need ON

]]
}

-- ASN1STOP
```

FIG. 5

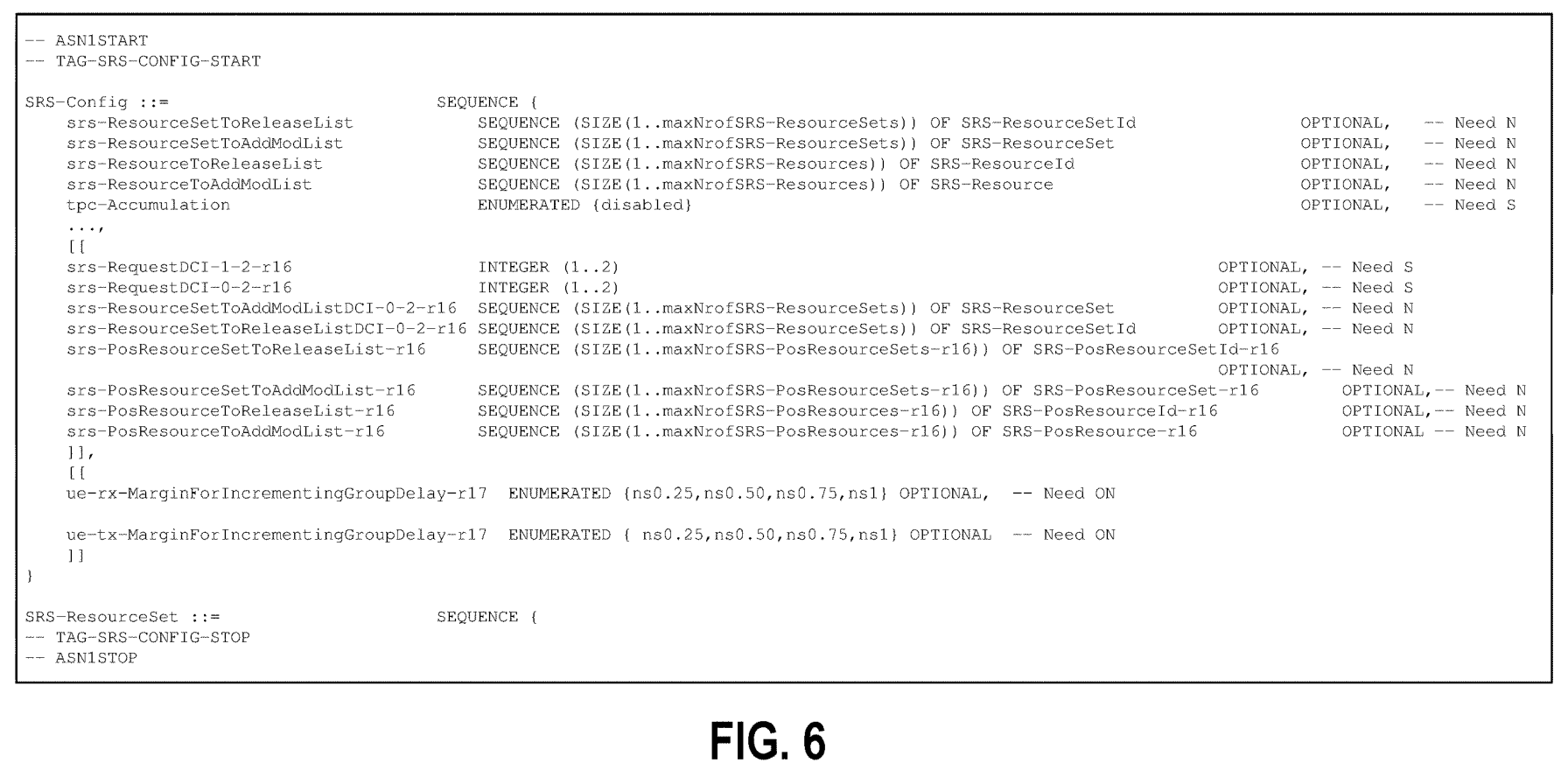

```
-- ASN1START
-- TAG-SRS-CONFIG-START

SRS-Config ::=                            SEQUENCE {
  srs-ResourceSetToReleaseList            SEQUENCE (SIZE(1..maxNrofSRS-ResourceSets)) OF SRS-ResourceSetId     OPTIONAL,    -- Need N
  srs-ResourceSetToAddModList             SEQUENCE (SIZE(1..maxNrofSRS-ResourceSets)) OF SRS-ResourceSet       OPTIONAL,    -- Need N
  srs-ResourceToReleaseList               SEQUENCE (SIZE(1..maxNrofSRS-Resources)) OF SRS-ResourceId           OPTIONAL,    -- Need N
  srs-ResourceToAddModList                SEQUENCE (SIZE(1..maxNrofSRS-Resources)) OF SRS-Resource             OPTIONAL,    -- Need N
  tpc-Accumulation                        ENUMERATED {disabled}                                                OPTIONAL,    -- Need S
  ...,
  [[
  srs-RequestDCI-1-2-r16                  INTEGER (1..2)                                                        OPTIONAL,    -- Need S
  srs-RequestDCI-0-2-r16                  INTEGER (1..2)                                                        OPTIONAL,    -- Need S
  srs-ResourceSetToAddModListDCI-0-2-r16  SEQUENCE (SIZE(1..maxNrofSRS-ResourceSets)) OF SRS-ResourceSet       OPTIONAL,    -- Need N
  srs-ResourceSetToReleaseListDCI-0-2-r16 SEQUENCE (SIZE(1..maxNrofSRS-ResourceSets)) OF SRS-ResourceSetId     OPTIONAL,    -- Need N
  srs-PosResourceSetToReleaseList-r16     SEQUENCE (SIZE(1..maxNrofSRS-PosResourceSets-r16)) OF SRS-PosResourceSetId-r16    OPTIONAL,    -- Need N
  srs-PosResourceSetToAddModList-r16      SEQUENCE (SIZE(1..maxNrofSRS-PosResourceSets-r16)) OF SRS-PosResourceSet-r16      OPTIONAL,    -- Need N
  srs-PosResourceToReleaseList-r16        SEQUENCE (SIZE(1..maxNrofSRS-PosResources-r16)) OF SRS-PosResourceId-r16          OPTIONAL,    -- Need N
  srs-PosResourceToAddModList-r16         SEQUENCE (SIZE(1..maxNrofSRS-PosResources-r16)) OF SRS-PosResource-r16            OPTIONAL,    -- Need N
  ]],
  [[
  ue-rx-MarginForIncrementingGroupDelay-r17   ENUMERATED {ns0.25,ns0.50,ns0.75,ns1} OPTIONAL,    -- Need ON
  ue-tx-MarginForIncrementingGroupDelay-r17   ENUMERATED { ns0.25,ns0.50,ns0.75,ns1} OPTIONAL    -- Need ON
  ]]
}

SRS-ResourceSet ::=                       SEQUENCE {
-- TAG-SRS-CONFIG-STOP
-- ASN1STOP
```

FIG. 6

```
-- ASN1START

NR-DL-TDOA-SignalMeasurementInformation-r16 ::= SEQUENCE {
    dl-PRS-ReferenceInfo-r16          DL-PRS-ID-Info-r16,
    nr-DL-TDOA-MeasList-r16           NR-DL-TDOA-MeasList-r16,
    ...,
[[
    nr-Ref-RxDelayGroup-SpatialIndex-r17     INTEGER (0..S)              OPTIONAL,
    nr-Ref-RxDelayGroup-TemporalIndex-r17    INTEGER (0..N)              OPTIONAL,
]]
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                     INTEGER (0..255),
    nr-PhysCellID-r16                 NR-PhysCellID-r16                      OPTIONAL,
    nr-CellGlobalID-r16               NCGI-r15                              OPTIONAL,
    nr-ARFCN-r16                      ARFCN-ValueNR-r15                     OPTIONAL,
    nr-DL-PRS-ResourceID-r16          NR-DL-PRS-ResourceID-r16              OPTIONAL,
    nr-DL-PRS-ResourceSetID-r16       NR-DL-PRS-ResourceSetID-r16           OPTIONAL,
    nr-TimeStamp-r16                  NR-TimeStamp-r16,
    nr-RSTD-r16                       CHOICE {
            k0-r16                        INTEGER (0..1970049),
            k1-r16                        INTEGER (0..985025),
            k2-r16                        INTEGER (0..492513),
            k3-r16                        INTEGER (0..246257),
            k4-r16                        INTEGER (0..123129),
            k5-r16                        INTEGER (0..61565),
            ...
    },
    nr-AdditionalPathList-r16         NR-AdditionalPathList-r16             OPTIONAL,
    nr-TimingQuality-r16              NR-TimingQuality-r16,
    nr-DL-PRS-RSRP-Result-r16         INTEGER (0..126)                     OPTIONAL,
    nr-DL-TDOA-AdditionalMeasurements-r16
                                      NR-DL-TDOA-AdditionalMeasurements-r16      OPTIONAL,
    ...,
[[
    nr-RxDelayGroup-SpatialIndex-r17     INTEGER (0..S)                  OPTIONAL,
    nr-RxDelayGroup-TemporalIndex-r17    INTEGER (0..N)                  OPTIONAL,
]]

}

NR-DL-TDOA-AdditionalMeasurements-r16 ::= SEQUENCE (SIZE (1..3)) OF
                                          NR-DL-TDOA-AdditionalMeasurementElement-r16

NR-DL-TDOA-AdditionalMeasurementElement-r16 ::= SEQUENCE {
    nr-DL-PRS-ResourceID-r16          NR-DL-PRS-ResourceID-r16              OPTIONAL,
    nr-DL-PRS-ResourceSetID-r16       NR-DL-PRS-ResourceSetID-r16           OPTIONAL,
    nr-TimeStamp-r16                  NR-TimeStamp-r16,
    nr-RSTD-ResultDiff-r16            CHOICE {
            k0-r16                        INTEGER (0..8191),
            k1-r16                        INTEGER (0..4095),
            k2-r16                        INTEGER (0..2047),
            k3-r16                        INTEGER (0..1023),
            k4-r16                        INTEGER (0..511),
            k5-r16                        INTEGER (0..255),
            ...
    },
    nr-TimingQuality-r16              NR-TimingQuality-r16,
    nr-DL-PRS-RSRP-ResultDiff-r16     INTEGER (0..61)                      OPTIONAL,
    nr-AdditionalPathList-r16         NR-AdditionalPathList-r16             OPTIONAL,
    ...,
[[
    nr-RxDelayGroup-SpatialIndex-r17     INTEGER (0..S)                  OPTIONAL,
    nr-RxDelayGroup-TemporalIndex-r17    INTEGER (0..N)                  OPTIONAL,
]]
}

-- ASN1STOP
```

FIG. 7

```
-- ASN1START

NR-DL-TDOA-SignalMeasurementInformation-r16 ::= SEQUENCE {
    dl-PRS-ReferenceInfo-r16         DL-PRS-ID-Info-r16,
    nr-DL-TDOA-MeasList-r16          NR-DL-TDOA-MeasList-r16,
    ... ,
[[
    nr-Ref-RxDelayGroup-SpatialIndex-r17     INTEGER (0..S)          OPTIONAL,
    nr-Ref-RxDelayGroup-TemporalIndex-r17    INTEGER (0..N)          OPTIONAL,
]]
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                    INTEGER (0..255),
    nr-PhysCellID-r16               NR-PhysCellID-r16                OPTIONAL,
    nr-CellGlobalID-r16             NCGI-r15                        OPTIONAL,
    nr-ARFCN-r16                    ARFCN-ValueNR-r15               OPTIONAL,
    nr-DL-PRS-ResourceID-r16        NR-DL-PRS-ResourceID-r16        OPTIONAL,
    nr-DL-PRS-ResourceSetID-r16     NR-DL-PRS-ResourceSetID-r16     OPTIONAL,
    nr-TimeStamp-r16                NR-TimeStamp-r16,
    nr-RSTD-r16                     CHOICE {
            k0-r16                      INTEGER (0..1970049),
            k1-r16                      INTEGER (0..985025),
            k2-r16                      INTEGER (0..492513),
            k3-r16                      INTEGER (0..246257),
            k4-r16                      INTEGER (0..123129),
            k5-r16                      INTEGER (0..61565),
            ...
    },
    nr-AdditionalPathList-r16       NR-AdditionalPathList-r16       OPTIONAL,
    nr-TimingQuality-r16            NR-TimingQuality-r16,
    nr-DL-PRS-RSRP-Result-r16       INTEGER (0..126)                OPTIONAL,
    nr-DL-TDOA-AdditionalMeasurements-r16
                                    NR-DL-TDOA-AdditionalMeasurements-r16    OPTIONAL,
    ...,
[[
    nr-RxDelayGroup-SpatialIndex-r17     INTEGER (0..S)             OPTIONAL,
    nr-RxDelayGroup-TemporalIndex-r17    INTEGER (0..N)             OPTIONAL,
]]
}

NR-DL-TDOA-AdditionalMeasurements-r16 ::= SEQUENCE (SIZE (1..3)) OF
                                            NR-DL-TDOA-AdditionalMeasurementElement-r16

NR-DL-TDOA-AdditionalMeasurementElement-r16 ::= SEQUENCE {
    nr-DL-PRS-ResourceID-r16        NR-DL-PRS-ResourceID-r16        OPTIONAL,
    nr-DL-PRS-ResourceSetID-r16     NR-DL-PRS-ResourceSetID-r16     OPTIONAL,
    nr-TimeStamp-r16                NR-TimeStamp-r16,
    nr-RSTD-ResultDiff-r16          CHOICE {
            k0-r16                      INTEGER (0..8191),
            k1-r16                      INTEGER (0..4095),
            k2-r16                      INTEGER (0..2047),
            k3-r16                      INTEGER (0..1023),
            k4-r16                      INTEGER (0..511),
            k5-r16                      INTEGER (0..255),
            ...
    },
    nr-TimingQuality-r16            NR-TimingQuality-r16,
    nr-DL-PRS-RSRP-ResultDiff-r16   INTEGER (0..61)                 OPTIONAL,
    nr-AdditionalPathList-r16       NR-AdditionalPathList-r16       OPTIONAL,
    ...,
[[
    nr-RxDelayGroup-TemporalIndex-r17    INTEGER (0..N)             OPTIONAL,
]]
}

-- ASN1STOP
```

FIG. 8

```
-- ASN1START

NR-Multi-RTT-SignalMeasurementInformation-r16 ::= SEQUENCE {
    nr-Multi-RTT-MeasList-r16        NR-Multi-RTT-MeasList-r16,
    nr-NTA-Offset-r16                ENUMERATED { nTA1, nTA2, nTA3, nTA4, ... }      OPTIONAL,
    ...
}

NR-Multi-RTT-MeasList-r16 ::= SEQUENCE (SIZE(1..nrMaxTRPs-r16)) OF NR-Multi-RTT-MeasElement-r16

NR-Multi-RTT-MeasElement-r16 ::= SEQUENCE {
    dl-PRS-ID-r16                    INTEGER (0..255),
    nr-PhysCellID-r16                NR-PhysCellID-r16                               OPTIONAL,
    nr-CellGlobalID-r16              NCGI-r15                                        OPTIONAL,
    nr-ARFCN-r16                     ARFCN-ValueNR-r15                               OPTIONAL,
    nr-DL-PRS-ResourceID-r16         NR-DL-PRS-ResourceID-r16                        OPTIONAL,
    nr-DL-PRS-ResourceSetID-r16      NR-DL-PRS-ResourceSetID-r16                     OPTIONAL,
    nr-UE-RxTxTimeDiff-r16           CHOICE {
            k0-r16                       INTEGER (0..1970049),
            k1-r16                       INTEGER (0..985025),
            k2-r16                       INTEGER (0..492513),
            k3-r16                       INTEGER (0..246257),
            k4-r16                       INTEGER (0..123129),
            k5-r16                       INTEGER (0..61565),
            ...
    },
    nr-AdditionalPathList-r16        NR-AdditionalPathList-r16                       OPTIONAL,
    nr-TimeStamp-r16                 NR-TimeStamp-r16,
    nr-TimingQuality-r16             NR-TimingQuality-r16,
    nr-DL-PRS-RSRP-Result-r16        INTEGER (0..126)                                OPTIONAL,
    nr-Multi-RTT-AdditionalMeasurements-r16
                                     NR-Multi-RTT-AdditionalMeasurements-r16         OPTIONAL,
    ...,
[[
    nr-RxDelayGroup-SpatialIndex-r17    INTEGER (0..S)                               OPTIONAL,
    nr-RxDelayGroup-TemporalIndex-r17   INTEGER (0..N)                               OPTIONAL,
]]}

NR-Multi-RTT-AdditionalMeasurements-r16 ::= SEQUENCE (SIZE (1..3)) OF
                                     NR-Multi-RTT-AdditionalMeasurementElement-r16

NR-Multi-RTT-AdditionalMeasurementElement-r16 ::= SEQUENCE {
    nr-DL-PRS-ResourceID-r16         NR-DL-PRS-ResourceID-r16                        OPTIONAL,
    nr-DL-PRS-ResourceSetID-r16      NR-DL-PRS-ResourceSetID-r16                     OPTIONAL,
    nr-DL-PRS-RSRP-ResultDiff-r16    INTEGER (0..61)                                 OPTIONAL,
    nr-UE-RxTxTimeDiffAdditional-r16 CHOICE {
            k0-r16                       INTEGER (0..8191),
            k1-r16                       INTEGER (0..4095),
            k2-r16                       INTEGER (0..2047),
            k3-r16                       INTEGER (0..1023),
            k4-r16                       INTEGER (0..511),
            k5-r16                       INTEGER (0..255),
            ...
    },
    nr-TimingQuality-r16             NR-TimingQuality-r16,
    nr-AdditionalPathList-r16        NR-AdditionalPathList-r16                       OPTIONAL,
    nr-TimeStamp-r16                 NR-TimeStamp-r16,
    ...,
[[
    nr-RxDelayGroup-SpatialIndex-r17    INTEGER (0..S)                               OPTIONAL,
    nr-RxDelayGroup-TemporalIndex-r17   INTEGER (0..N)                               OPTIONAL,
]]

}

-- ASN1STOP
```

FIG. 9

```
-- ASN1START

NR-Multi-RTT-SignalMeasurementInformation-r16 ::= SEQUENCE {
    nr-Multi-RTT-MeasList-r16        NR-Multi-RTT-MeasList-r16,
    nr-NTA-Offset-r16                ENUMERATED { nTA1, nTA2, nTA3, nTA4, ... }     OPTIONAL,
    ...
}

NR-Multi-RTT-MeasList-r16 ::= SEQUENCE (SIZE(1..nrMaxTRPs-r16)) OF NR-Multi-RTT-MeasElement-r16

NR-Multi-RTT-MeasElement-r16 ::= SEQUENCE {
    dl-PRS-ID-r16                    INTEGER (0..255),
    nr-PhysCellID-r16                NR-PhysCellID-r16                            OPTIONAL,
    nr-CellGlobalID-r16              NCGI-r15                                     OPTIONAL,
    nr-ARFCN-r16                     ARFCN-ValueNR-r15                            OPTIONAL,
    nr-DL-PRS-ResourceID-r16         NR-DL-PRS-ResourceID-r16                     OPTIONAL,
    nr-DL-PRS-ResourceSetID-r16      NR-DL-PRS-ResourceSetID-r16                  OPTIONAL,
    nr-UE-RxTxTimeDiff-r16           CHOICE {
            k0-r16                       INTEGER (0..1970049),
            k1-r16                       INTEGER (0..985025),
            k2-r16                       INTEGER (0..492513),
            k3-r16                       INTEGER (0..246257),
            k4-r16                       INTEGER (0..123129),
            k5-r16                       INTEGER (0..61565),
            ...
    },
    nr-AdditionalPathList-r16        NR-AdditionalPathList-r16                    OPTIONAL,
    nr-TimeStamp-r16                 NR-TimeStamp-r16,
    nr-TimingQuality-r16             NR-TimingQuality-r16,
    nr-DL-PRS-RSRP-Result-r16        INTEGER (0..126)                             OPTIONAL,
    nr-Multi-RTT-AdditionalMeasurements-r16
                                     NR-Multi-RTT-AdditionalMeasurements-r16      OPTIONAL,
...,
[[
    nr-RxDelayGroup-SpatialIndex-r17    INTEGER (0..S)                            OPTIONAL,
    nr-RxDelayGroup-TemporalIndex-r17   INTEGER (0..N)                            OPTIONAL,
]]
}

NR-Multi-RTT-AdditionalMeasurements-r16 ::= SEQUENCE (SIZE (1..3)) OF
                                     NR-Multi-RTT-AdditionalMeasurementElement-r16

NR-Multi-RTT-AdditionalMeasurementElement-r16 ::= SEQUENCE {
    nr-DL-PRS-ResourceID-r16         NR-DL-PRS-ResourceID-r16                     OPTIONAL,
    nr-DL-PRS-ResourceSetID-r16      NR-DL-PRS-ResourceSetID-r16                  OPTIONAL,
    nr-DL-PRS-RSRP-ResultDiff-r16    INTEGER (0..61)                             OPTIONAL,
    nr-UE-RxTxTimeDiffAdditional-r16  CHOICE {
            k0-r16                       INTEGER (0..8191),
            k1-r16                       INTEGER (0..4095),
            k2-r16                       INTEGER (0..2047),
            k3-r16                       INTEGER (0..1023),
            k4-r16                       INTEGER (0..511),
            k5-r16                       INTEGER (0..255),
            ...
    },
    nr-TimingQuality-r16             NR-TimingQuality-r16,
    nr-AdditionalPathList-r16        NR-AdditionalPathList-r16                    OPTIONAL,
    nr-TimeStamp-r16                 NR-TimeStamp-r16,
    ...,
[[
    nr-RxDelayGroup-TemporalIndex-r17   INTEGER (0..N)                            OPTIONAL,
]]

}

-- ASN1STOP
```

FIG. 10

| IE/Group Name | Presence | Range | IE Type and Reference | Semantics Description |
|---|---|---|---|---|
| Measured Result Item | | 1 .. <maxnoPosMeas> | | |
| >CHOICE Measured Results Value | M | | | |
| >>UL Angle of Arrival | M | | 9.2.38 | |
| >>UL SRS-RSRP | M | | INTEGER (0..126) | |
| >>UL RTOA | M | | 9.2.39 | |
| >>gNB Rx-Tx Time Difference | M | | 9.2.40 | |
| >Time Stamp | M | | 9.2.42 | |
| >Measurement Quality | O | | 9.2.43 | |
| >Measurement Beam Information | O | | 9.2.57 | |
| >Spatial Index | O | | INTEGER (0..S) | |
| >Temporal Index | O | | INTEGER (0..N) | |

FIG. 11

```
-- ASN1START
NR-DL-TDOA-SignalMeasurementInformation-r16 ::= SEQUENCE {
    dl-PRS-ReferenceInfo-r16          DL-PRS-ID-Info-r16,
    nr-DL-TDOA-MeasList-r16           NR-DL-TDOA-MeasList-r16,
    ... ,
[[
    nr-Ref-RxDelayGroup-SpatialIndex-r17     INTEGER (0..S)              OPTIONAL,
    nr-Ref-RxDelayGroup-TemporalIndex-r17    INTEGER (0..N)              OPTIONAL,
    nr-Ref-RxDelayGroup-FrequencyIndex-r17   INTEGER (0..M)              OPTIONAL,
]]

}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                     INTEGER (0..255),
    nr-PhysCellID-r16                 NR-PhysCellID-r16                  OPTIONAL,
    nr-CellGlobalID-r16               NCGI-r15                          OPTIONAL,
    nr-ARFCN-r16                      ARFCN-ValueNR-r15                 OPTIONAL,
    nr-DL-PRS-ResourceID-r16          NR-DL-PRS-ResourceID-r16          OPTIONAL,
    nr-DL-PRS-ResourceSetID-r16       NR-DL-PRS-ResourceSetID-r16       OPTIONAL,
    nr-TimeStamp-r16                  NR-TimeStamp-r16,
    nr-RSTD-r16                       CHOICE {
            k0-r16                        INTEGER (0..1970049),
            k1-r16                        INTEGER (0..985025),
            k2-r16                        INTEGER (0..492513),
            k3-r16                        INTEGER (0..246257),
            k4-r16                        INTEGER (0..123129),
            k5-r16                        INTEGER (0..61565),
            ...
    },
    nr-AdditionalPathList-r16         NR-AdditionalPathList-r16         OPTIONAL,
    nr-TimingQuality-r16              NR-TimingQuality-r16,
    nr-DL-PRS-RSRP-Result-r16         INTEGER (0..126)                  OPTIONAL,
    nr-DL-TDOA-AdditionalMeasurements-r16
                                      NR-DL-TDOA-AdditionalMeasurements-r16   OPTIONAL,
    ...,
[[
    nr-RxDelayGroup-SpatialIndex-r17     INTEGER (0..S)                 OPTIONAL,
    nr-RxDelayGroup-TemporalIndex-r17    INTEGER (0..N)                 OPTIONAL,
    nr-RxDelayGroup-FrequencyIndex-r17   INTEGER (0..M)                 OPTIONAL,
]]
}

NR-DL-TDOA-AdditionalMeasurements-r16 ::= SEQUENCE (SIZE (1..3)) OF
                                            NR-DL-TDOA-AdditionalMeasurementElement-r16

NR-DL-TDOA-AdditionalMeasurementElement-r16 ::= SEQUENCE {
    nr-DL-PRS-ResourceID-r16          NR-DL-PRS-ResourceID-r16          OPTIONAL,
    nr-DL-PRS-ResourceSetID-r16       NR-DL-PRS-ResourceSetID-r16       OPTIONAL,
    nr-TimeStamp-r16                  NR-TimeStamp-r16,
    nr-RSTD-ResultDiff-r16            CHOICE {
            k0-r16                        INTEGER (0..8191),
            k1-r16                        INTEGER (0..4095),
            k2-r16                        INTEGER (0..2047),
            k3-r16                        INTEGER (0..1023),
            k4-r16                        INTEGER (0..511),
            k5-r16                        INTEGER (0..255),
            ...
    },
    nr-TimingQuality-r16              NR-TimingQuality-r16,
    nr-DL-PRS-RSRP-ResultDiff-r16     INTEGER (0..61)                   OPTIONAL,
    nr-AdditionalPathList-r16         NR-AdditionalPathList-r16         OPTIONAL,
    ...,
[[
    nr-RxDelayGroup-SpatialIndex-r17     INTEGER (0..S)                 OPTIONAL,
    nr-RxDelayGroup-TemporalIndex-r17    INTEGER (0..N)                 OPTIONAL,
    nr-RxDelayGroup-FrequencyIndex-r17   INTEGER (0..M)                 OPTIONAL,
]]
}
-- ASN1STOP
```

FIG. 12

```
-- ASN1START

NR-DL-TDOA-SignalMeasurementInformation-r16 ::= SEQUENCE {
    dl-PRS-ReferenceInfo-r16        DL-PRS-ID-Info-r16,
    nr-DL-TDOA-MeasList-r16         NR-DL-TDOA-MeasList-r16,
    ... [[
    nr-RxDelayGroup-SpatialIndex-r17    INTEGER (0..S)              OPTIONAL,
    nr-RxDelayGroup-TemporalIndex-r17   INTEGER (0..N)              OPTIONAL,
    nr-RxDelayGroup-FrequencyIndex-r17  INTEGER (0..M)              OPTIONAL,
]]

}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                   INTEGER (0..255),
    nr-PhysCellID-r16              NR-PhysCellID-r16               OPTIONAL,
    nr-CellGlobalID-r16           NCGI-r15                        OPTIONAL,
    nr-ARFCN-r16                  ARFCN-ValueNR-r15               OPTIONAL,
    nr-DL-PRS-ResourceID-r16      NR-DL-PRS-ResourceID-r16        OPTIONAL,
    nr-DL-PRS-ResourceSetID-r16   NR-DL-PRS-ResourceSetID-r16     OPTIONAL,
    nr-TimeStamp-r16              NR-TimeStamp-r16,
    nr-RSTD-r16                   CHOICE {
            k0-r16                   INTEGER (0..1970049),
            k1-r16                   INTEGER (0..985025),
            k2-r16                   INTEGER (0..492513),
            k3-r16                   INTEGER (0..246257),
            k4-r16                   INTEGER (0..123129),
            k5-r16                   INTEGER (0..61565),
            ...
    },
    nr-AdditionalPathList-r16     NR-AdditionalPathList-r16       OPTIONAL,
    nr-TimingQuality-r16          NR-TimingQuality-r16,
    nr-DL-PRS-RSRP-Result-r16     INTEGER (0..126)                OPTIONAL,
    nr-DL-TDOA-AdditionalMeasurements-r16
                                  NR-DL-TDOA-AdditionalMeasurements-r16       OPTIONAL,
    ...,
[[
    nr-RxDelayGroup-SpatialIndex-r17    INTEGER (0..S)              OPTIONAL,
    nr-RxDelayGroup-TemporalIndex-r17   INTEGER (0..N)              OPTIONAL,
    nr-RxDelayGroup-FrequencyIndex-r17  INTEGER (0..M)              OPTIONAL,
]]
}

NR-DL-TDOA-AdditionalMeasurements-r16 ::= SEQUENCE (SIZE (1..3)) OF
                                             NR-DL-TDOA-AdditionalMeasurementElement-r16

NR-DL-TDOA-AdditionalMeasurementElement-r16 ::= SEQUENCE {
    nr-DL-PRS-ResourceID-r16      NR-DL-PRS-ResourceID-r16        OPTIONAL,
    nr-DL-PRS-ResourceSetID-r16   NR-DL-PRS-ResourceSetID-r16     OPTIONAL,
    nr-TimeStamp-r16              NR-TimeStamp-r16,
    nr-RSTD-ResultDiff-r16        CHOICE {
            k0-r16                   INTEGER (0..8191),
            k1-r16                   INTEGER (0..4095),
            k2-r16                   INTEGER (0..2047),
            k3-r16                   INTEGER (0..1023),
            k4-r16                   INTEGER (0..511),
            k5-r16                   INTEGER (0..255),
            ...
    },
    nr-TimingQuality-r16          NR-TimingQuality-r16,
    nr-DL-PRS-RSRP-ResultDiff-r16 INTEGER (0..61)                 OPTIONAL,
    nr-AdditionalPathList-r16     NR-AdditionalPathList-r16       OPTIONAL,
    ...,
[[
    nr-RxDelayGroup-TemporalIndex-r17   INTEGER (0..N)              OPTIONAL,
    nr-RxDelayGroup-FrequencyIndex-r17  INTEGER (0..M)              OPTIONAL,
]]
}

-- ASN1STOP
```

FIG. 13

```
-- ASN1START

NR-DL-TDOA-SignalMeasurementInformation-r16 ::= SEQUENCE {
    dl-PRS-ReferenceInfo-r16         DL-PRS-ID-Info-r16,
    nr-DL-TDOA-MeasList-r16          NR-DL-TDOA-MeasList-r16,
    ... ,
[[
    nr-Ref-RxDelayGroup-SpatialIndex-r17     INTEGER (0..S)          OPTIONAL,
    nr-Ref-RxDelayGroup-TemporalIndex-r17    INTEGER (0..N)          OPTIONAL,
]]

}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                    INTEGER (0..255),
    nr-PhysCellID-r16               NR-PhysCellID-r16                OPTIONAL,
    nr-CellGlobalID-r16             NCGI-r15                        OPTIONAL,
    nr-ARFCN-r16                    ARFCN-ValueNR-r15               OPTIONAL,
    nr-DL-PRS-ResourceID-r16        NR-DL-PRS-ResourceID-r16        OPTIONAL,
    nr-DL-PRS-ResourceSetID-r16     NR-DL-PRS-ResourceSetID-r16     OPTIONAL,
    nr-TimeStamp-r16                NR-TimeStamp-r16,
    nr-RSTD-r16                     CHOICE {
            k0-r16                      INTEGER (0..1970049),
            k1-r16                      INTEGER (0..985025),
            k2-r16                      INTEGER (0..492513),
            k3-r16                      INTEGER (0..246257),
            k4-r16                      INTEGER (0..123129),
            k5-r16                      INTEGER (0..61565),
            ...
    },
    nr-AdditionalPathList-r16       NR-AdditionalPathList-r16       OPTIONAL,
    nr-TimingQuality-r16            NR-TimingQuality-r16,
    nr-DL-PRS-RSRP-Result-r16       INTEGER (0..126)                OPTIONAL,
    nr-DL-TDOA-AdditionalMeasurements-r16
                                    NR-DL-TDOA-AdditionalMeasurements-r16    OPTIONAL,
    ...,
[[
    nr-RxDelayGroup-SpatialIndex-r17     INTEGER (0..S)             OPTIONAL,
    nr-RxDelayGroup-TemporalIndex-r17    INTEGER (0..N)             OPTIONAL,
    nr-RxDelayGroup-FrequencyIndex-r17   INTEGER (0..M)             OPTIONAL,
]]
}

NR-DL-TDOA-AdditionalMeasurements-r16 ::= SEQUENCE (SIZE (1..3)) OF
                                        NR-DL-TDOA-AdditionalMeasurementElement-r16

NR-DL-TDOA-AdditionalMeasurementElement-r16 ::= SEQUENCE {
    nr-DL-PRS-ResourceID-r16        NR-DL-PRS-ResourceID-r16        OPTIONAL,
    nr-DL-PRS-ResourceSetID-r16     NR-DL-PRS-ResourceSetID-r16     OPTIONAL,
    nr-TimeStamp-r16                NR-TimeStamp-r16,
    nr-RSTD-ResultDiff-r16          CHOICE {
            k0-r16                      INTEGER (0..8191),
            k1-r16                      INTEGER (0..4095),
            k2-r16                      INTEGER (0..2047),
            k3-r16                      INTEGER (0..1023),
            k4-r16                      INTEGER (0..511),
            k5-r16                      INTEGER (0..255),
            ...
    },
    nr-TimingQuality-r16            NR-TimingQuality-r16,
    nr-DL-PRS-RSRP-ResultDiff-r16   INTEGER (0..61)                 OPTIONAL,
    nr-AdditionalPathList-r16       NR-AdditionalPathList-r16       OPTIONAL,
    ...,
[[
    nr-RxDelayGroup-SpatialIndex-r17     INTEGER (0..S)     OPTIONAL,   -- NotSameAsRelRes0
    nr-RxDelayGroup-TemporalIndex-r17    INTEGER (0..N)     OPTIONAL,   -- NotSameAsRelRes1
    nr-RxDelayGroup-FrequencyIndex-r17   INTEGER (0..M)     OPTIONAL,   -- NotSameAsRelRes2
]]
}
-- ASN1STOP
```

FIG. 14

| Conditional Presence | Explanation |
|---|---|
| *NotSameAsRelRes0* | The target device shall include this field if the *nr-RxDelayGroup-SpatialIndex* of the additional measurement DL-PRS resource is different from the *nr-RxDelayGroup-SpatialIndex* of the DL-PRS resource of the same TRP used to determine the *nr-RSTD* value. Otherwise the field is absent. |
| *NotSameAsRelRes1* | The target device shall include this field if the *nr-RxDelayGroup-TemporalIndex* of the additional measurement DL-PRS resource is different from the *nr-RxDelayGroup-TemporalIndex* of the DL-PRS resource of the same TRP used to determine the *nr-RSTD* value. Otherwise the field is absent. |
| *NotSameAsRelRes2* | The target device shall include this field if the *nr-RxDelayGroup-FrequencyIndex* of the additional measurement DL-PRS resource is different from the *nr-RxDelayGroup-FrequencyIndex* of the DL-PRS resource of the same TRP used to determine the *nr-RSTD* value. Otherwise the field is absent. |

FIG. 15

```
-- ASN1START

NR-Multi-RTT-SignalMeasurementInformation-r16 ::= SEQUENCE {
    nr-Multi-RTT-MeasList-r16        NR-Multi-RTT-MeasList-r16,
    nr-NTA-Offset-r16                ENUMERATED { nTA1, nTA2, nTA3, nTA4, ... }     OPTIONAL,
    ...
}

NR-Multi-RTT-MeasList-r16 ::= SEQUENCE (SIZE(1..nrMaxTRPs-r16)) OF NR-Multi-RTT-MeasElement-r16

NR-Multi-RTT-MeasElement-r16 ::= SEQUENCE {
    dl-PRS-ID-r16                    INTEGER (0..255),
    nr-PhysCellID-r16                NR-PhysCellID-r16                              OPTIONAL,
    nr-CellGlobalID-r16              NCGI-r15                                       OPTIONAL,
    nr-ARFCN-r16                     ARFCN-ValueNR-r15                              OPTIONAL,
    nr-DL-PRS-ResourceID-r16         NR-DL-PRS-ResourceID-r16                       OPTIONAL,
    nr-DL-PRS-ResourceSetID-r16      NR-DL-PRS-ResourceSetID-r16                    OPTIONAL,
    nr-UE-RxTxTimeDiff-r16           CHOICE {
            k0-r16                          INTEGER (0..1970049),
            k1-r16                          INTEGER (0..985025),
            k2-r16                          INTEGER (0..492513),
            k3-r16                          INTEGER (0..246257),
            k4-r16                          INTEGER (0..123129),
            k5-r16                          INTEGER (0..61565),
            ...
    },
    nr-AdditionalPathList-r16        NR-AdditionalPathList-r16                      OPTIONAL,
    nr-TimeStamp-r16                 NR-TimeStamp-r16,
    nr-TimingQuality-r16             NR-TimingQuality-r16,
    nr-DL-PRS-RSRP-Result-r16        INTEGER (0..126)                              OPTIONAL,
    nr-Multi-RTT-AdditionalMeasurements-r16
                                     NR-Multi-RTT-AdditionalMeasurements-r16       OPTIONAL,
    ...,
[[
    nr-RxDelayGroup-SpatialIndex-r17    INTEGER (0..S)                             OPTIONAL,
    nr-RxDelayGroup-TemporalIndex-r17   INTEGER (0..N)                             OPTIONAL,
    nr-RxDelayGroup-FrequencyIndex-r17  INTEGER (0..M)                             OPTIONAL,
]]

}

NR-Multi-RTT-AdditionalMeasurements-r16 ::= SEQUENCE (SIZE (1..3)) OF
                                NR-Multi-RTT-AdditionalMeasurementElement-r16

NR-Multi-RTT-AdditionalMeasurementElement-r16 ::= SEQUENCE {
    nr-DL-PRS-ResourceID-r16         NR-DL-PRS-ResourceID-r16                      OPTIONAL,
    nr-DL-PRS-ResourceSetID-r16      NR-DL-PRS-ResourceSetID-r16                   OPTIONAL,
    nr-DL-PRS-RSRP-ResultDiff-r16    INTEGER (0..61)                               OPTIONAL,
    nr-UE-RxTxTimeDiffAdditional-r16 CHOICE {
            k0-r16                          INTEGER (0..8191),
            k1-r16                          INTEGER (0..4095),
            k2-r16                          INTEGER (0..2047),
            k3-r16                          INTEGER (0..1023),
            k4-r16                          INTEGER (0..511),
            k5-r16                          INTEGER (0..255),
            ...
    },
    nr-TimingQuality-r16             NR-TimingQuality-r16,
    nr-AdditionalPathList-r16        NR-AdditionalPathList-r16                      OPTIONAL,
    nr-TimeStamp-r16                 NR-TimeStamp-r16,
    ...,
[[
    nr-RxDelayGroup-SpatialIndex-r17    INTEGER (0..S)                             OPTIONAL,
    nr-RxDelayGroup-TemporalIndex-r17   INTEGER (0..N)                             OPTIONAL,
    nr-RxDelayGroup-FrequencyIndex-r17  INTEGER (0..M)                             OPTIONAL,
]]
}

-- ASN1STOP
```

FIG. 16

```
-- ASN1START

NR-Multi-RTT-SignalMeasurementInformation-r16 ::= SEQUENCE {
    nr-Multi-RTT-MeasList-r16        NR-Multi-RTT-MeasList-r16,
    nr-NTA-Offset-r16                ENUMERATED { nTA1, nTA2, nTA3, nTA4, ... }    OPTIONAL,
    ...
}

NR-Multi-RTT-MeasList-r16 ::= SEQUENCE (SIZE(1..nrMaxTRPs-r16)) OF NR-Multi-RTT-MeasElement-r16

NR-Multi-RTT-MeasElement-r16 ::= SEQUENCE {
    dl-PRS-ID-r16                    INTEGER (0..255),
    nr-PhysCellID-r16                NR-PhysCellID-r16                             OPTIONAL,
    nr-CellGlobalID-r16              NCGI-r15                                      OPTIONAL,
    nr-ARFCN-r16                     ARFCN-ValueNR-r15                             OPTIONAL,
    nr-DL-PRS-ResourceID-r16         NR-DL-PRS-ResourceID-r16                      OPTIONAL,
    nr-DL-PRS-ResourceSetID-r16      NR-DL-PRS-ResourceSetID-r16                   OPTIONAL,
    nr-UE-RxTxTimeDiff-r16           CHOICE {
            k0-r16                       INTEGER (0..1970049),
            k1-r16                       INTEGER (0..985025),
            k2-r16                       INTEGER (0..492513),
            k3-r16                       INTEGER (0..246257),
            k4-r16                       INTEGER (0..123129),
            k5-r16                       INTEGER (0..61565),
            ...
    },
    nr-AdditionalPathList-r16        NR-AdditionalPathList-r16                     OPTIONAL,
    nr-TimeStamp-r16                 NR-TimeStamp-r16,
    nr-TimingQuality-r16             NR-TimingQuality-r16,
    nr-DL-PRS-RSRP-Result-r16        INTEGER (0..126)                             OPTIONAL,
    nr-Multi-RTT-AdditionalMeasurements-r16
                                     NR-Multi-RTT-AdditionalMeasurements-r16       OPTIONAL,
    ...,
[[
    nr-RxDelayGroup-SpatialIndex-r17    INTEGER (0..S)                            OPTIONAL,
    nr-RxDelayGroup-TemporalIndex-r17   INTEGER (0..N)                            OPTIONAL,
    nr-RxDelayGroup-FrequencyIndex-r17  INTEGER (0..M)                            OPTIONAL,
]]

}

NR-Multi-RTT-AdditionalMeasurements-r16 ::= SEQUENCE (SIZE (1..3)) OF
                                 NR-Multi-RTT-AdditionalMeasurementElement-r16

NR-Multi-RTT-AdditionalMeasurementElement-r16 ::= SEQUENCE {
    nr-DL-PRS-ResourceID-r16             NR-DL-PRS-ResourceID-r16                 OPTIONAL,
    nr-DL-PRS-ResourceSetID-r16          NR-DL-PRS-ResourceSetID-r16              OPTIONAL,
    nr-DL-PRS-RSRP-ResultDiff-r16        INTEGER (0..61)                          OPTIONAL,
    nr-UE-RxTxTimeDiffAdditional-r16     CHOICE {
            k0-r16                           INTEGER (0..8191),
            k1-r16                           INTEGER (0..4095),
            k2-r16                           INTEGER (0..2047),
            k3-r16                           INTEGER (0..1023),
            k4-r16                           INTEGER (0..511),
            k5-r16                           INTEGER (0..255),
            ...
    },
    nr-TimingQuality-r16                 NR-TimingQuality-r16,
    nr-AdditionalPathList-r16            NR-AdditionalPathList-r16                OPTIONAL,
    nr-TimeStamp-r16                     NR-TimeStamp-r16,
    ...,
[[
    nr-RxDelayGroup-TemporalIndex-r17   INTEGER (0..N)                           OPTIONAL,
    nr-RxDelayGroup-FrequencyIndex-r17  INTEGER (0..M)                           OPTIONAL,
]]
}

-- ASN1STOP
```

FIG. 17

```
-- ASN1START
NR-Multi-RTT-SignalMeasurementInformation-r16 ::= SEQUENCE {
    nr-Multi-RTT-MeasList-r16        NR-Multi-RTT-MeasList-r16,
    nr-NTA-Offset-r16                ENUMERATED { nTA1, nTA2, nTA3, nTA4, ... }      OPTIONAL,
    ...,
[[
    nr-Ref-RxDelayGroup-SpatialIndex-r17     INTEGER (0..S)                 OPTIONAL,
    nr-Ref-RxDelayGroup-TemporalIndex-r17    INTEGER (0..N)                 OPTIONAL,
]]

}

NR-Multi-RTT-MeasList-r16 ::= SEQUENCE (SIZE(1..nrMaxTRPs-r16)) OF NR-Multi-RTT-MeasElement-r16

NR-Multi-RTT-MeasElement-r16 ::= SEQUENCE {
    dl-PRS-ID-r16                    INTEGER (0..255),
    nr-PhysCellID-r16                NR-PhysCellID-r16                        OPTIONAL,
    nr-CellGlobalID-r16              NCGI-r15                                 OPTIONAL,
    nr-ARFCN-r16                     ARFCN-ValueNR-r15                        OPTIONAL,
    nr-DL-PRS-ResourceID-r16         NR-DL-PRS-ResourceID-r16                 OPTIONAL,
    nr-DL-PRS-ResourceSetID-r16      NR-DL-PRS-ResourceSetID-r16             OPTIONAL,
    nr-UE-RxTxTimeDiff-r16           CHOICE {
            k0-r16                       INTEGER (0..1970049),
            k1-r16                       INTEGER (0..985025),
            k2-r16                       INTEGER (0..492513),
            k3-r16                       INTEGER (0..246257),
            k4-r16                       INTEGER (0..123129),
            k5-r16                       INTEGER (0..61565),
            ...
    },
    nr-AdditionalPathList-r16        NR-AdditionalPathList-r16               OPTIONAL,
    nr-TimeStamp-r16                 NR-TimeStamp-r16,
    nr-TimingQuality-r16             NR-TimingQuality-r16,
    nr-DL-PRS-RSRP-Result-r16        INTEGER (0..126)                        OPTIONAL,
    nr-Multi-RTT-AdditionalMeasurements-r16
                                     NR-Multi-RTT-AdditionalMeasurements-r16  OPTIONAL,
    ...,
[[
    nr-RxDelayGroup-SpatialIndex-r17     INTEGER (0..S)                 OPTIONAL,
    nr-RxDelayGroup-TemporalIndex-r17    INTEGER (0..N)                 OPTIONAL,
    nr-RxDelayGroup-FrequencyIndex-r17   INTEGER (0..M)                 OPTIONAL,
]]

}

NR-Multi-RTT-AdditionalMeasurements-r16 ::= SEQUENCE (SIZE (1..3)) OF
                                NR-Multi-RTT-AdditionalMeasurementElement-r16

NR-Multi-RTT-AdditionalMeasurementElement-r16 ::= SEQUENCE {
    nr-DL-PRS-ResourceID-r16         NR-DL-PRS-ResourceID-r16                 OPTIONAL,
    nr-DL-PRS-ResourceSetID-r16      NR-DL-PRS-ResourceSetID-r16             OPTIONAL,
    nr-DL-PRS-RSRP-ResultDiff-r16    INTEGER (0..61)                         OPTIONAL,
    nr-UE-RxTxTimeDiffAdditional-r16     CHOICE {
            k0-r16                       INTEGER (0..8191),
            k1-r16                       INTEGER (0..4095),
            k2-r16                       INTEGER (0..2047),
            k3-r16                       INTEGER (0..1023),
            k4-r16                       INTEGER (0..511),
            k5-r16                       INTEGER (0..255),
            ...
    },
    nr-TimingQuality-r16             NR-TimingQuality-r16,
    nr-AdditionalPathList-r16        NR-AdditionalPathList-r16               OPTIONAL,
    nr-TimeStamp-r16                 NR-TimeStamp-r16,
    ...,
[[
    nr-RxDelayGroup-SpatialIndex-r17     INTEGER (0..S)      OPTIONAL,   -- NotSameAsRelRes0
    nr-RxDelayGroup-TemporalIndex-r17    INTEGER (0..N)      OPTIONAL,   -- NotSameAsRelRes1
    nr-RxDelayGroup-FrequencyIndex-r17   INTEGER (0..M)      OPTIONAL,   -- NotSameAsRelRes2
]]
}
-- ASN1STOP
```

FIG. 18

| IE/Group Name | Presence | Range | IE Type and Reference | Semantics Description |
|---|---|---|---|---|
| Measured Result Item | | 1 .. <maxnoPosMeas> | | |
| >CHOICE Measured Results Value | M | | | |
| >>UL Angle of Arrival | M | | 9.2.38 | |
| >>UL SRS-RSRP | M | | INTEGER (0..126) | |
| >>UL RTOA | M | | 9.2.39 | |
| >>gNB Rx-Tx Time Difference | M | | 9.2.40 | |
| >Time Stamp | M | | 9.2.42 | |
| >Measurement Quality | O | | 9.2.43 | |
| >Measurement Beam Information | O | | 9.2.57 | |
| >Spatial Index | O | | INTEGER (0..S) | |
| >Temporal Index | O | | INTEGER (0..N) | |
| >Temporal Index | O | | INTEGER (0..M) | |

FIG. 19

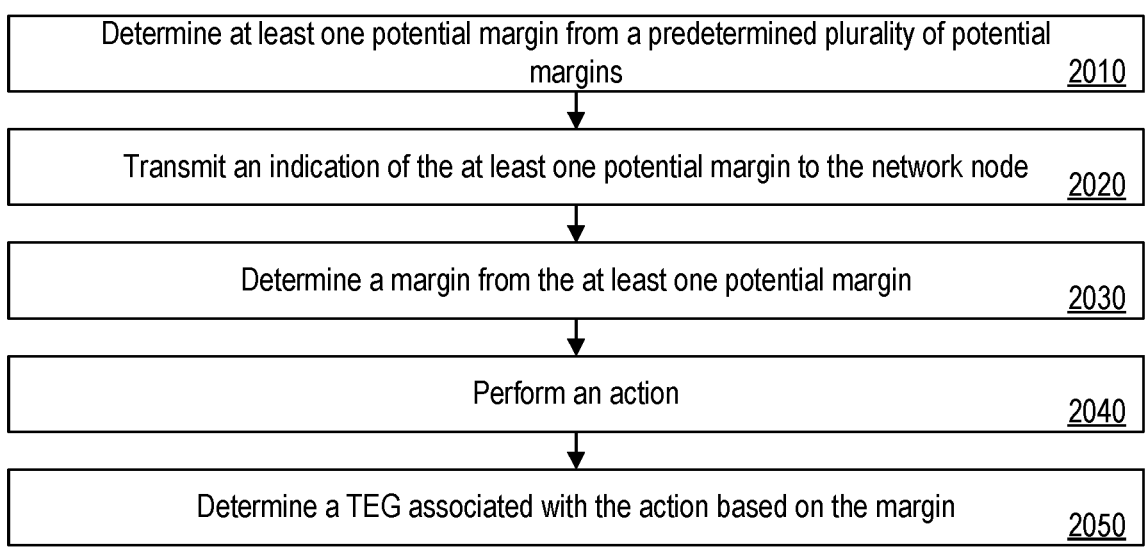

| Determine at least one potential margin from a predetermined plurality of potential margins | 2010 |

| Transmit an indication of the at least one potential margin to the network node | 2020 |

| Determine a margin from the at least one potential margin | 2030 |

| Perform an action | 2040 |

| Determine a TEG associated with the action based on the margin | 2050 |

FIG. 20

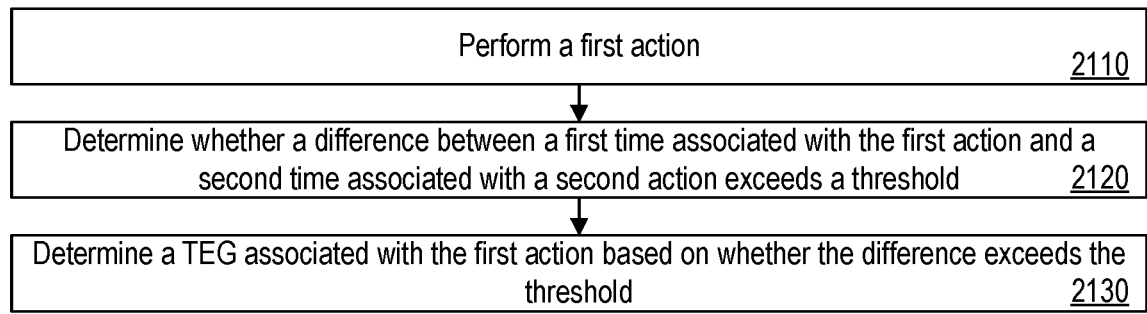

| Perform a first action | 2110 |

| Determine whether a difference between a first time associated with the first action and a second time associated with a second action exceeds a threshold | 2120 |

| Determine a TEG associated with the first action based on whether the difference exceeds the threshold | 2130 |

FIG. 21

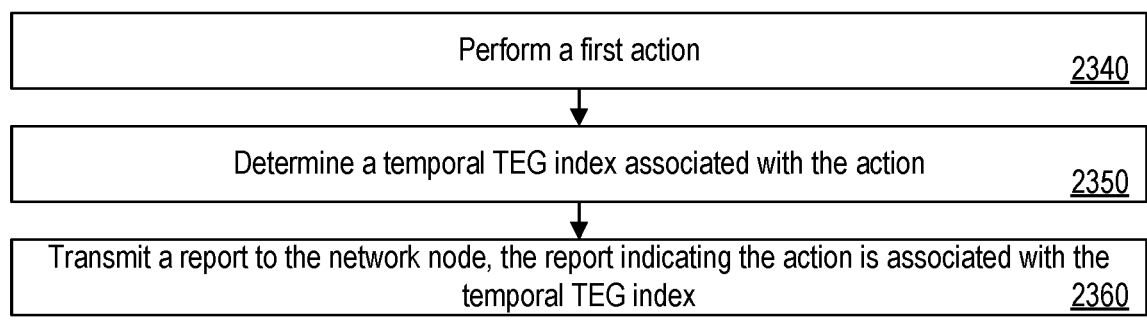

| Perform a first action | 2340 |

| Determine a temporal TEG index associated with the action | 2350 |

| Transmit a report to the network node, the report indicating the action is associated with the temporal TEG index | 2360 |

FIG. 22

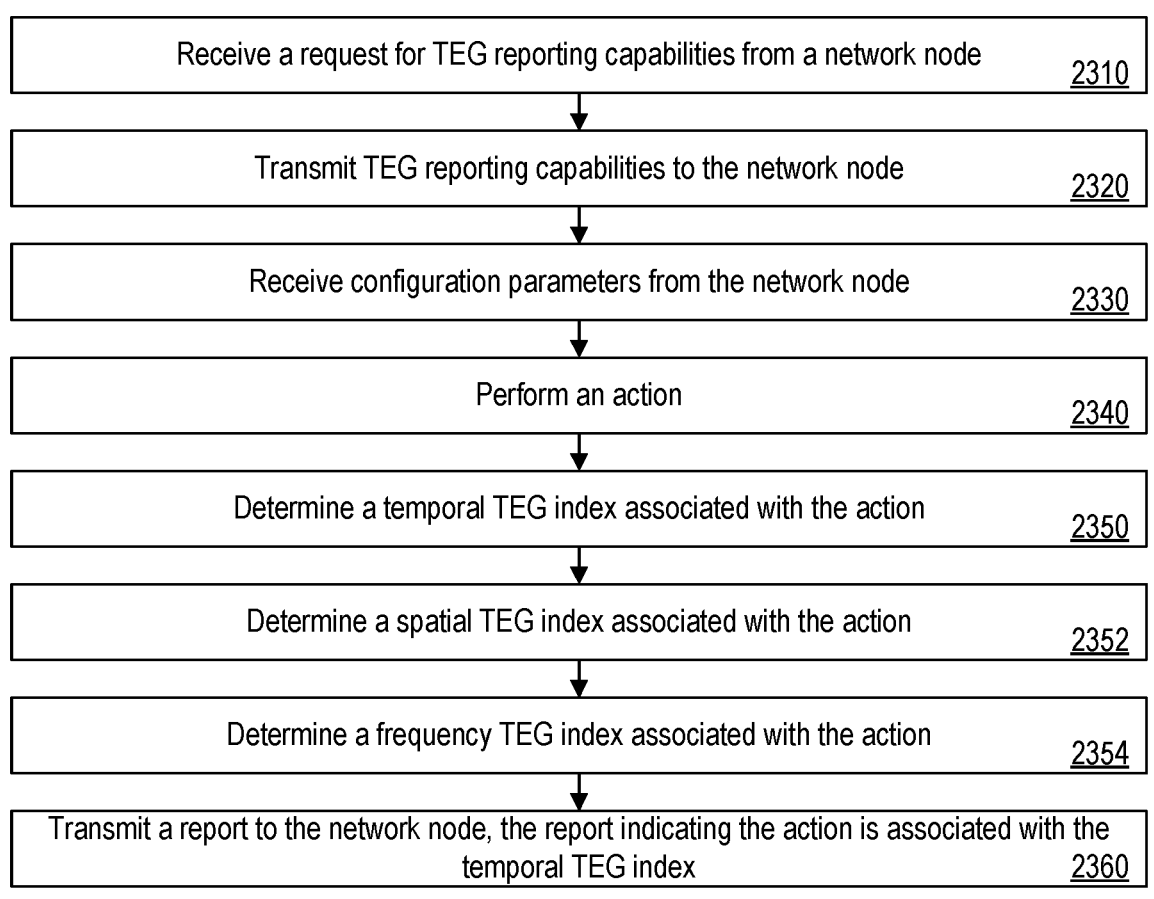

| Receive a request for TEG reporting capabilities from a network node | 2310 |

| Transmit TEG reporting capabilities to the network node | 2320 |

| Receive configuration parameters from the network node | 2330 |

| Perform an action | 2340 |

| Determine a temporal TEG index associated with the action | 2350 |

| Determine a spatial TEG index associated with the action | 2352 |

| Determine a frequency TEG index associated with the action | 2354 |

| Transmit a report to the network node, the report indicating the action is associated with the temporal TEG index | 2360 |

FIG. 23

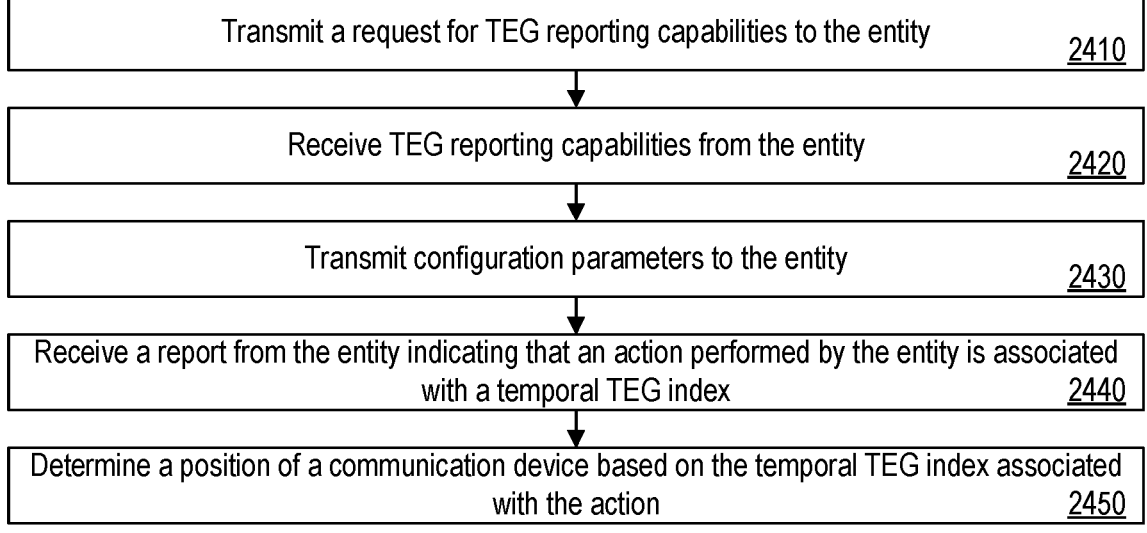

| Transmit a request for TEG reporting capabilities to the entity | 2410 |

| Receive TEG reporting capabilities from the entity | 2420 |

| Transmit configuration parameters to the entity | 2430 |

| Receive a report from the entity indicating that an action performed by the entity is associated with a temporal TEG index | 2440 |

| Determine a position of a communication device based on the temporal TEG index associated with the action | 2450 |

Figure 27:
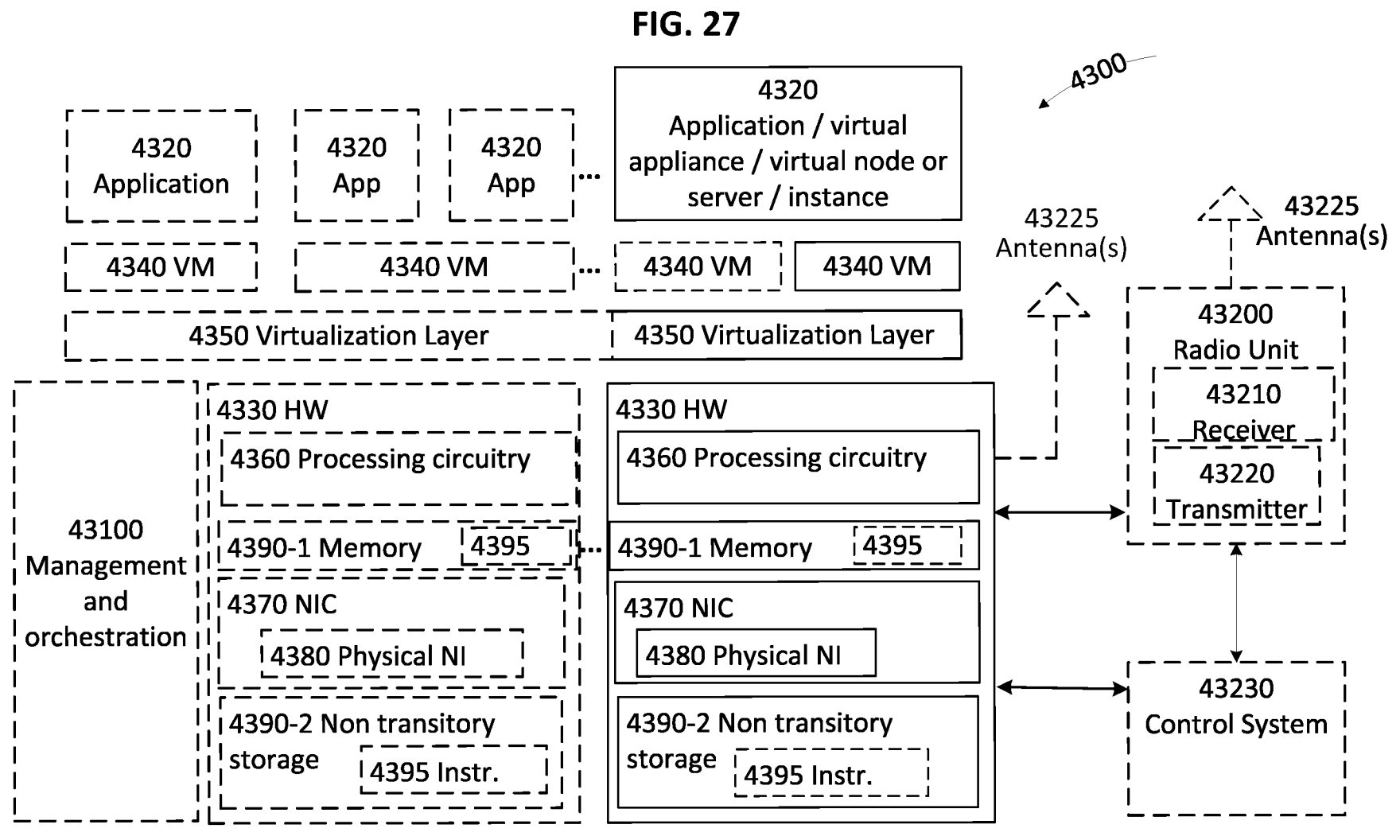

43225 Antenna(s)

43200 Radio Unit
- 43210 Receiver
- 43220 Transmitter

43230 Control System

43225 Antenna(s)

4320 Application / virtual appliance / virtual node or server / instance

4340 VM

4350 Virtualization Layer

4330 HW
- 4360 Processing circuitry
- 4390-1 Memory　4395
- 4370 NIC
  - 4380 Physical NI
- 4390-2 Non transitory storage　4395 Instr.

4320 Application

4340 VM

4320 App

4320 App

4340 VM

4350 Virtualization Layer

4330 HW
- 4360 Processing circuitry
- 4390-1 Memory　4395
- 4370 NIC
  - 4380 Physical NI
- 4390-2 Non transitory storage　4395 Instr.

43100 Management and orchestration

TEMPORAL AND FREQUENCY-DEPENDENT TIMING ERROR GROUPS

CROSS REFERENCE TO RELATED APPLICATIONS

This application is a 35 U.S.C. § 371 national stage application of PCT International Application No. PCT/EP2022/058685 filed on Mar. 31, 2022, which in turn claims domestic priority to U.S. Provisional Patent Application No. 63/169,553, filed on Apr. 1, 2021, the disclosures and content of which are incorporated by reference herein in their entirety.

TECHNICAL FIELD

The present disclosure relates generally to communications, and more particularly to communication methods and related devices and nodes for determining timing error groups for positioning.

BACKGROUND

FIG. 1 illustrates an example of a 5th Generation ("5G") network (also referred to as a new radio ("NR") network) including a pair of network nodes 110a-b (e.g., 5G base stations ("gNB")) and multiple communication devices 120 (also referred to as user equipment ("UE")).

Positioning has been a topic in long term evolution ("LTE") standardization since $3^{rd}$ generation partnership project ("3GPP") Release 9. The primary objective was initially to fulfill regulatory requirements for emergency call positioning but other use cases like positioning for industrial internet of things ("I-IoT") are becoming important. Positioning in NR is supported by the architecture shown in FIG. 2. A location management function ("LMF") is the location node in 5G/5G core ("5GC")/NR. There are also interactions between the location node and the gNodeB ("gNB") via the NR positioning protocol A ("NRPPa"). The interactions between the gNodeB and the device is supported via the Radio Resource Control ("RRC") protocol, while the location node interfaces with the UE via the LTE positioning protocol ("LPP"). LPP is common to both NR and LTE.

In some examples, the gNB and ng-eNB may not always both be present. In additional or alternative examples, when both the gNB and ng-eNB are present, the NG-C interface is only present for one of them.

In the legacy LTE standards, the following techniques are supported: Enhanced Cell Identifier ("ID"); Assisted Global Navigation Satellite System ("GNSS"); Observed Time Difference of Arrival ("OTDOA"); and Uplink Time Difference of Arrival ("UTDOA"). Enhanced Cell ID includes cell ID information to associate the device to the serving area of a serving cell, and then additional information to determine a finer granularity position. Assisted GNSS information can be retrieved by the device and supported by assistance information provided to the device from an evolved serving mobile location center ("E-SMLC"). OTDOA can be estimated by the device as the time difference of reference signals from different base stations and can be sent to the E-SMLC for multilateration. The device can be requested to transmit a specific waveform that is detected by multiple location measurement units (e.g., an eNB) at known positions. These measurements can be forwarded to E-SMLC for multilateration.

In NR Rel. 16, a number of positioning features were specified. A new downlink ("DL") reference signal, the NR DL Positioning Reference Signal ("PRS") was specified. The main benefit of this signal in relation to the LTE DL PRS is the increased bandwidth, configurable from 24 to 272 resource blocks ("RBs"), which gives a big improvement in time of arrival ("TOA") accuracy. The NR DL PRS can be configured with a comb factor of 2, 4, 6, or 12. Comb-12 allows for twice as many orthogonal signals as the comb-6 LTE PRS.

Rel-16 NR DL PRS is organized in a 3-level hierarchy: PRS resource; PRS resource set; and PRS frequency layer. The PRS resource can be associated to a beam former for directive transmission of a DL-PRS. The PRS resource set corresponds to a collection of PRS resources (beams), which are all originating from the same transmission and reception point ("TRP"). All resource in the same set have the same comb factor. The PRS frequency layer gathers PRS resource sets from (potentially) multiple base station, having common parameters. If two resource sets are in the same frequency layer, they: operate in the same band with the same subcarrier spacing; have the same comb factor; and have the same starting PRB and bandwidth.

In NR Rel. 16, the NR uplink ("UL") sounding reference signal ("SRS") for positioning was introduced. Compared to the existing SRS in release 15, the Rel. 16 NR SRS for positioning allows for a longer signal, up to 12 symbols (compared to 4 symbols in Rel. 15), and a flexible position in the slot (only last six symbols of the slot can be used in Rel. 15). It also allows for a staggered comb RE pattern for improved TOA measurement range and for more orthogonal signals based on comb offsets (comb 2, 4, and 8) and cyclic shifts. The use of cyclic shifts longer than the orthogonal frequency domain modulation ("OFDM") symbol divided by the comb factor is, however, not supported by Rel. 16 despite that this is the main advantage of comb-staggering at least in indoor scenarios. Power control based on neighbor cell SSB/DL PRS is supported as well as spatial quasi-colocation ("QCL") relations towards a channel state information reference signal ("CSI-RS"), an synchronization signal block ("SSB"), a DL PRS or another SRS.

In NR Rel. 16, the following UE measurements are specified: DL reference signal time different ("RSTD"); multi-cell UE Rx-Tx Time Difference measurement; and DL PRS reference signal received power ("RSRP"). DL RSTD can allow for, for example, DL TDOA positioning. Multi cell UE Rx-Tx Time Difference measurement can allow for multi cell RTT measurements.

In NR Rel. 16, the following gNB measurements are specified and supported: UL-RTOA, useful for UL TDOA positioning; gNB Rx-Tx time difference, useful for multi cell RTT measurements; UL SRS-RSRP; and Azimuth of arrival and zenith of arrival.

SUMMARY

According to some embodiments, a method of operating a communication device in a communications network that includes a network node is provided. The method includes determining at least one potential margin from a predetermined plurality of potential margins. Each potential margin of the plurality of potential margins is a potential maximum margin of timing error difference between two measurements based on positioning related reference signals or transmissions of positioning related reference signals. The method further includes transmitting an indication of the at least one potential margin to the network node. The method further includes determining a margin from the at least one potential margin. The method further includes performing an action. The method further includes determining a timing error group ("TEG") associated with the action based on the margin.

According to other embodiments, a method of operating a communication device in a communications network that includes a network node is provided. The method includes performing a first action. The method further includes determining whether a difference between a first time associated with when the first action was performed and a second time associated with when a second action was performed exceeds a threshold. The method further includes determining a timing error group ("TEG") associated with the first action based on whether the difference exceeds the threshold.

According to other embodiments, a method of operating a communication device in a communications network that includes a network node is provided. The method includes performing an action. The method further includes determining a temporal timing error group ("TEG") index associated with the action. The method further includes transmitting a report to the network node, the report indicating the action is associated with the temporal TEG index.

According to other embodiments, a method of operating a communication device in a communications network that includes a network node is provided. The method includes receiving a request for timing error group ("TEG") reporting capabilities from the network node. The method further includes, responsive to receiving the request, transmitting TEG reporting capabilities to the network node, the TEG reporting capabilities indicating that the communication device is capable of determining a temporal TEG index associated with an action and reporting that the temporal TEG index is associated with the action to the network node.

According to other embodiments, a method of operating a network node in a communications network that includes a communication device is provided. The method includes receiving a report from the communication node, the report indicating that an action performed by the communication device is associated with a temporal timing error group ("TEG") index. The method further includes determining a position of the communication device based on the temporal TEG index associated with the action.

According to other embodiments, a method of operating a network node in a communications network that includes a communication device is provided. The method includes transmitting a request for timing error group ("TEG") reporting capabilities to the communication device. The method further includes, responsive to transmitting the request, receiving TEG reporting capabilities from the communication device, the TEG reporting capabilities indicating that the communication device is capable of determining a temporal TEG index associated with an action and reporting that the temporal TEG index is associated with the action to the network node.

According to other embodiments, a communication device, network node, computer program, and a computer program product can be provided for performing the above methods.

Various embodiments described herein allow the use of a temporal timing error group ("TEG") (also sometimes referred to as a delay group) index that allows for flexible handling of temporal variations in timing errors giving improvements in positioning accuracy with limited signaling overhead.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 illustrates an example of a NR-Multi-RTT-ProvideAssistanceData IE according to some embodiments of inventive concepts;

FIG. 6 illustrates an example of a SRS-Config 1E according to some embodiments of inventive concepts;

FIGS. 7-10 illustrate examples of a NR-DL-TDOA-SignalMeasurementInformation IE according to some embodiments of inventive concepts;

FIG. 11 is a table illustrating an example of signaling of gNB Rx timing error group via TRP Measurement Result IE FIGS. 12-14 illustrate examples of signaling in NR-DL-TDOA-SignalMeasurementInformation IE according to some embodiments of inventive concepts;

FIG. 15 is a table illustrating an example of presence conditions for interpreting omitted fields according to some embodiments of inventive concepts;

FIGS. 16-18 illustrate examples of signaling in NR-DL-TDOA-SignalMeasurementInformation IE according to some embodiments of inventive concepts;

FIG. 19 it a table illustrating an example of signaling of gNB Rx timing error group via TRP Measurement Result IE according to some embodiments of inventive concepts;

FIGS. 20-23 are flow charts illustrating examples of operations of a UE according to some embodiments of inventive concepts;

FIG. 24 is a flow chart illustrating examples of operations of a network node according to some embodiments of inventive concepts.

FIG. 27 is a block diagram of a virtualization environment in accordance with some embodiments;

DETAILED DESCRIPTION

Figure 1:
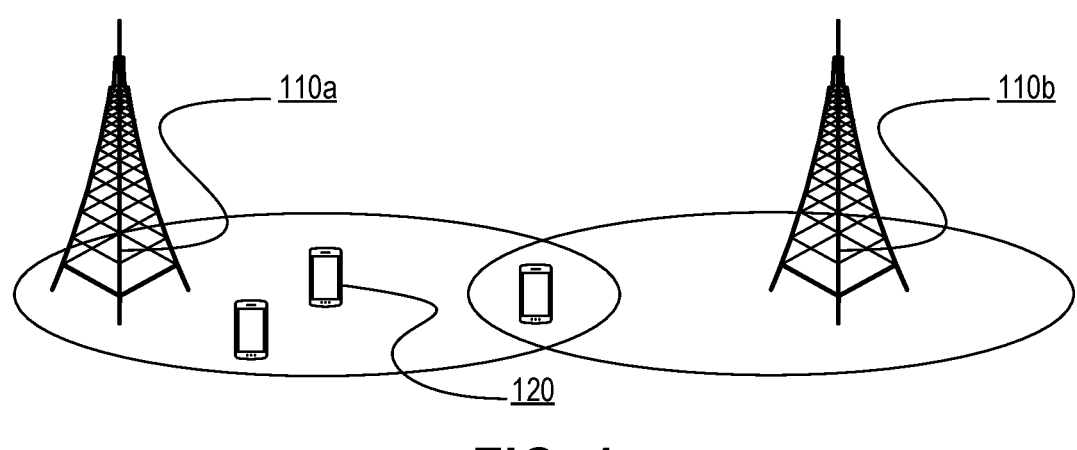
FIG. 1 is a schematic diagram illustrating an example of a wireless communications network.
Figure 2:
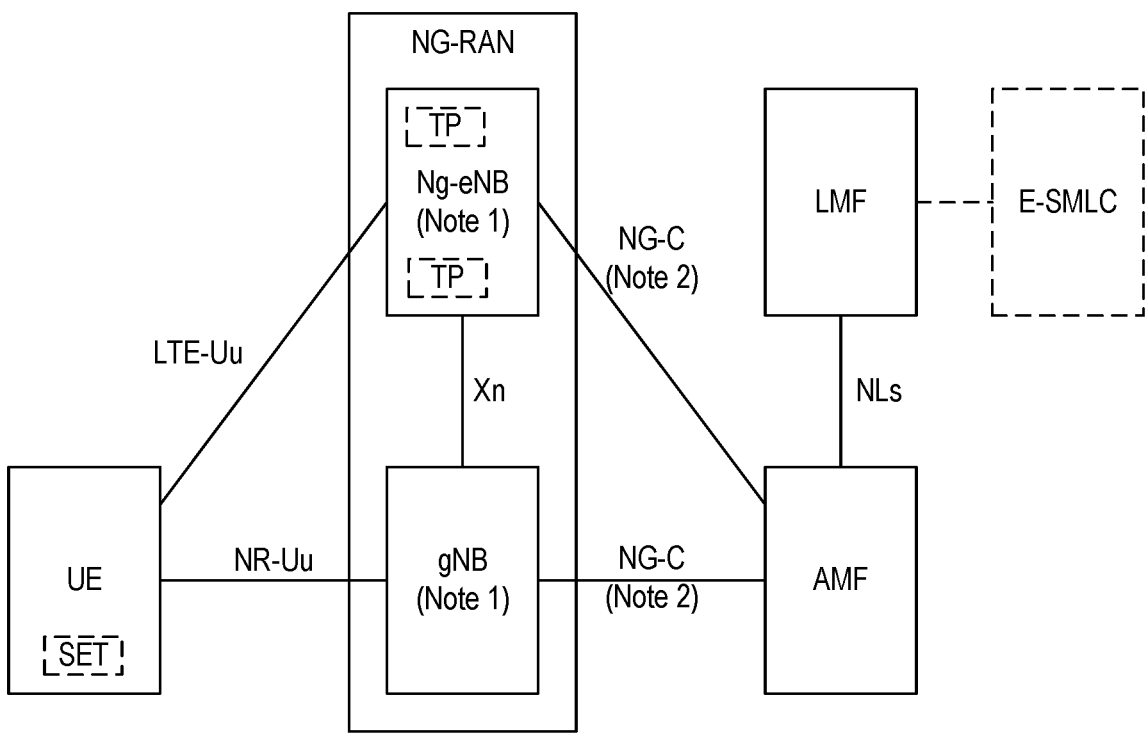
FIG. 2 is a block diagram illustrating an example of NG-RAN Rel-15 LCS protocols.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

A work item of the $3^{rd}$ generation partnership project ("3GPP") includes a focus on positioning enhancements, with a goal of specifying measurements, signaling, and procedures for improving positioning accuracy of the Rel-16 NR positioning methods by mitigating UE Rx/Tx and/or gNB Rx/Tx timing delays, including: DL, UL and DL+UL positioning methods; and UE-based and UE-assisted positioning solutions.

Mitigation mechanisms based on timing error groups (also referred to herein as delay groups) have been discussed. Receptions and/or transmissions can be associated to a certain timing error group. For receptions and/or transmissions associated to the same timing error group, the RX and/or TX timing errors can be the same within some margin. By reporting the timing error group of a RX or TX to the entity performing positioning, the impact of the RX and/or TX timing errors on the positioning accuracy can be reduced and accuracy can be improved.

A timing error group can correspond to which antenna panel or which RX/TX chain that was used for the RX/TX. The concept of timing error group can also be replaced by an RX/TX chain index or antenna panel index.

The concept of timing error group as it has been discussed in 3GPP isn't suited to handle temporal aspects of the RX/TX timing errors. The TX and RX timing errors may depend on time, for example, due to temperature variations. Thus, additional timing error groups may need to be added with time, requiring a very large or even unlimited number of timing error groups. This can be very costly to signal.

In some cases, the Tx and Rx timing errors may also be frequency dependent. This is because the group delays are introduced by RF filters whose components can be frequency dependent. Hence, additional timing error groups may also need to be added with frequency, which would require a very large or even unlimited number of timing error groups. This can also be very costly to signal.

The TX and RX timing errors may also depend on timer or clock drifts or changes in temperature (typically due to variations in node power consumption, for example, when transmitting or not), so after a while it may become ambiguous whether a larger error is due to the timer/clock drift or because of a different antenna panel.

Furthermore, the UE may sometimes perform adjustments in timers or clocks, for example, to compensate for the timer/clock drift. After adjustment the estimated error can be different, but it may also be different due to using a different antenna panel, which also introduces ambiguity.

A general description of a procedure based on TEGs with a spatial and a temporal index is described below.

Timing error groups ("TEGs") (also referred to herein as delay groups) can be define, for example, UE RX, UE TX, gNB RX, and gNB TX. Various embodiments described herein can be applied to any of these TEGs. In some embodiments herein, RX/TX is intended to be interpreted as RX when applied to UE RX or gNB RX TEGs and as TX when applied to UE TX or gNB TX TEGs.

For each possible TEG spatial index value a TEG temporal index counter taking values from 0 to N where N>=1 (e.g. N=1) is maintained by the RX/TX node.

When a RX/TX is performed, to be used for a timing measurement for positioning, a spatial index and a temporal index is associated with the RX/TX by the RX/TX node.

The spatial index is selected based on e.g. which RX/TX antenna panel that was utilized, which RX/TX chain that was utilized and/or which RX/TX beam that was utilized. In one embodiment the spatial index indicates which RX/TX antenna panel that was utilized and takes the values 1, 2, . . . , M where M is the number of antenna panels.

The RX node evaluates if the value of the TEG temporal index counter corresponding to the selected spatial index should be changed or not and changes the value according to the outcome of the evaluation. In one embodiment, if the timing error of the RX/TX is evaluated by the RX/TX node not to be equal within a margin δ as the RX/TX timing error of the previous RX/TX for the same spatial index value then the RX/TX node increases the temporal index counter corresponding to the selected spatial index value by 1 modulo N+1 (i.e. if the counter is <N the RX/TX node increases the counter by one, otherwise the RX/TX node sets the counter to 0).

The evaluation of the need to change the TEG temporal index counter may depend on e.g.: 1) the time between the RX/TX and previous RX/TX associated to the same spatial index (the timing error may drift with time and if too long time has elapsed the timing errors may differ more than acceptable within the TEG); 2) the RX/TX node may have performed an adjustment of RX/TX timing which may cause timing error differences that are larger than acceptable within the TEG; and 3) the temperature at the time of the RX/TX and at the time of previous RX/TX associated to the same spatial index, as measured by the RX/TX node (the timing error may depend on temperature).

After changing the value of the TEG temporal index counter according to the evaluation, the RX node associates the TEG temporal index counter value to the RX as it's TEG temporal index.

If the RX/TX positioning node isn't the positioning node the spatial and temporal indices associated to the RX/TX are signaled to the positioning node.

A timing measurement is associated to the same spatial and temporal indices as the RX/TX used for the measurement.

Two measurements are considered to be part of the same TEG if: 1) they have the same TEG spatial index; 2) they have the same TEG temporal index; 3) no measurement has been reported with: a) the same TEG spatial index; b) with a different temporal index; c) with a timestamp in the time interval between the timestamps of the two measurements.

The positioning node utilizes the grouping of timing measurements into TEGs in positioning the UE.

Figure 3:
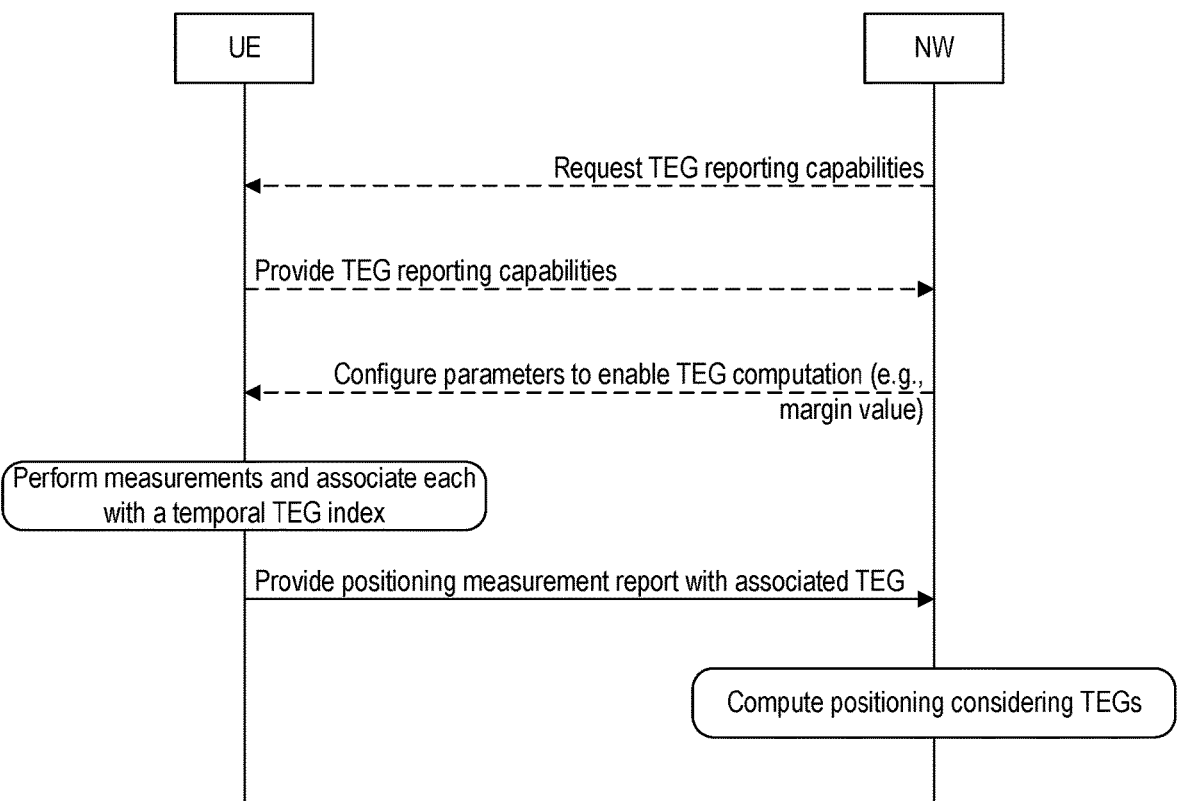
FIGS. 3-4 are flow charts illustrating examples of operations according to some embodiments of inventive concepts.

FIG. 3 illustrates an example of UE RX behavior with respect to TEGs and LMF computing positioning considering TEGs.

Figure 4:
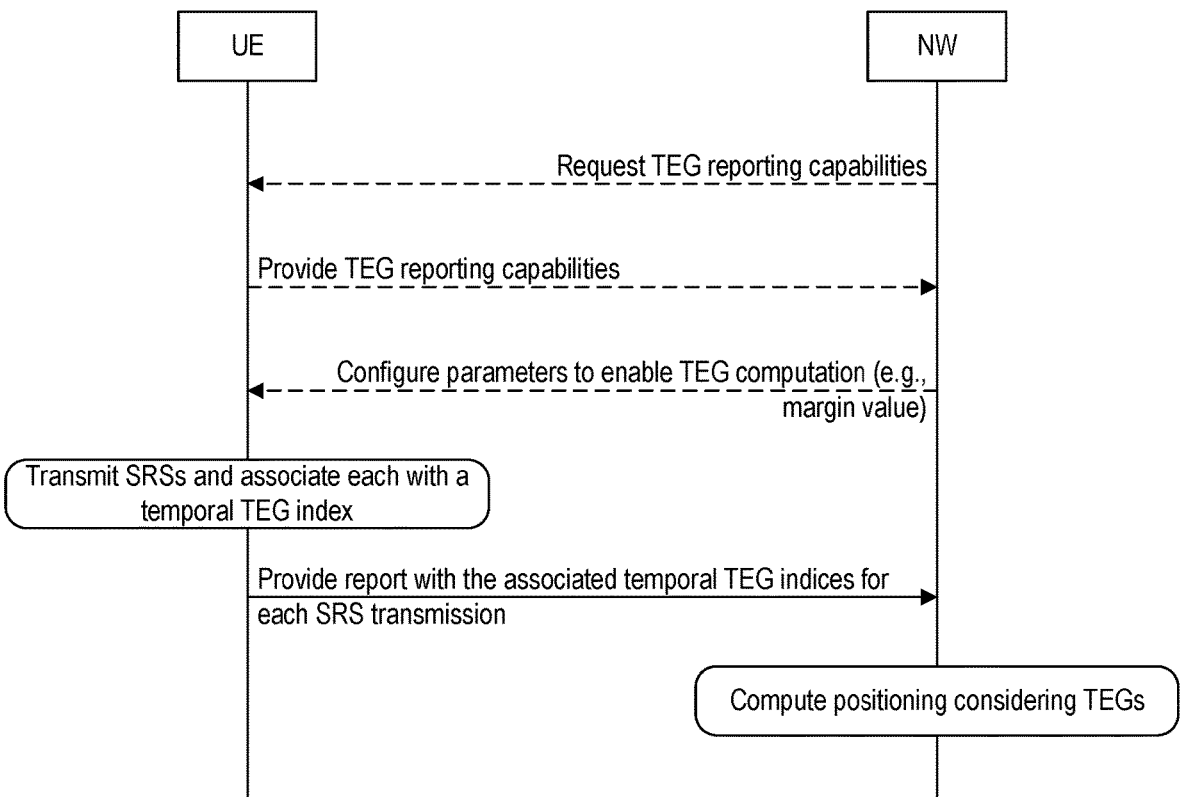

FIG. 4 illustrates an example of UE TX behavior with respect to TEGs and LMF computing positioning considering TEGs.

The use of a TEG temporal index allows for flexible handling of temporal variations in timing errors giving improvements in positioning accuracy with limited signaling overhead.

Mechanism to specify efficient signaling for TEGs to obtain higher accuracy by mitigating UE Rx-Tx errors when multiple UE panels are involved for measurements.

In some embodiments, the positioning node selects one TRP in each TEG as reference TRP and form the time difference between each measurement with the measurement for the reference TRP in the same TEG. This cancels the timing errors within the margin δ. The positioning node positions the UE based on the time differences formed.

In additional or alternative embodiments, the positioning node positions the UE by solving an equation system with one unknown variable for the timing error of each TEG in addition to the unknown variables for the UE position.

Handling of frequency layers and frequency bands are described below.

Timing errors may differ depending on carrier frequency band, carrier frequency within a frequency band, or even on frequency part within a carrier used for the reference signal or on the DL PRS frequency layer.

In some embodiments, TEGs are defined independently within each carrier frequency band (two RX/TXs in different frequency bands are thus never part of the same TEG).

In additional or alternative embodiment, TEGs are defined independently within each carrier (two RX/TXs on different carriers are thus never part of the same TEG).

In additional or alternative embodiments, TEGs are defined independently for each frequency part (two RX/TXs in different frequency parts are thus never part of the same TEG).

In additional or alternative embodiments, TEGs are defined independently for each DL PRS frequency layer (two RX/TXs in different DL PRS frequency layers are thus never part of the same TEG).

Embodiments using frequency dependent TEG index are described below.

For each possible TEG spatial index value, the UE maintains frequency-dependent TEG index taking values from 0 to M where M>=1 (e.g., M=1). The M frequency-dependent TEG indices may, for example, be defined within any one of the following: 1) a PRS frequency layer (i.e., different frequency parts in the same PRS frequency layer associated with different frequency-dependent TEG indices), 2) over multiple PRS frequency layers (i.e., different frequency parts in the same or different PRS frequency layers associated with different frequency-dependent TEG indices), 3) a carrier or serving cell (i.e., different frequency parts in the same carrier or serving cell associated with different frequency-dependent Rx TEG indices), and 4) over multiple carriers or serving cells (i.e., different frequency parts in the same or different carriers or serving cells associated with different frequency-dependent Rx TEG indices).

Two measurements are considered to be part of the same TEG if they have the same TEG spatial index, and they have the same TEG frequency-dependent index.

In some embodiments, for each possible TEG spatial index value, the UE maintains both a TEG temporal index and a frequency-dependent TEG index an two measurements are considered to be part of the same TEG if: they have the same TEG spatial index; they have the same TEG temporal index; they have the same TEG frequency-dependent index; and no measurement has been reported with the same TEG spatial index, the same TEG frequency-dependent index, with a different temporal index, and with a timestamp in the time interval between the timestamps of the two measurements.

In some embodiments, the UE may perform two timing measurements corresponding to the same spatial index value and the same temporal index value in different frequency parts (e.g., two PRSs in different parts of a PRS frequency layer). If the RX timing error of the second timing measurement is evaluated by the UE not to be equal within a margin δ as the RX timing error of the previous timing measurement for the same spatial index value and the same temporal index value, then the UE increases the frequency-dependent index for the same spatial index value and the same temporal index value by 1 modulo M+1 (i.e. if the frequency-dependent index is <M the UE increases the frequency-dependent index by one, otherwise the UE sets the frequency-dependent index to 0).

In some embodiments, only one TEG temporal index counter, valid for all spatial index values, is maintained and used to associate temporal indices to all RX/TX.

In additional or alternative embodiments, the temporal index can be increased by two steps if the maximum RX timing error difference between two consecutive timing measurements is evaluated to be larger than twice the margin, but less than three times the margin. In general and in more detail, the temporal index for the same spatial index value is increased by $$\text{floor[max RX timing error difference/δ]modulo N+1}$$

for a specific "RX timing error" between two timing measurements.

In additional or alternative embodiments, the temporal index counter is increased by floor[max RX timing error difference/d] modulo N+1, where d is a fixed temporal stepsize in error difference.

This can give the positioning node more detailed information of the timing error differences between different measurements which can be utilized for improved positioning performance.

As an example, for a number of measurements {measurement_value_i, spatial_index_i, temporal_index_i}, i=1, 2, . . . , M for which spatial_index is the same, the timing error difference between two measurement i and j>i can be assumed to be smaller than δ+(temporal_index_j−temporal_index_i modulo N−1)*d where is the maximum error difference between two measurements with the same spatial index performed very close in time.

In additional or alternative embodiments, TEGs and the corresponding spatial and temporal indices are defined for a combination of RX timing errors and TX timing errors. This is useful for RTT based positioning when the SRS's are configured with a spatial relation to a DL PRS or other RS transmitted from the target TRP, coupling RX and TX timing errors.

In additional or alternative embodiments, no temporal index is used. Instead two RX/TX/timing measurements with the same spatial TEG index are considered to be in the same TEG only if the time between the two RX/TX/timing measurements as given by signaled timestamps is smaller than a threshold. In one embodiment the threshold value is signaled to the node performing positioning. In another embodiment the threshold value is specified.

Environmental index is further described below. An environmental index is used to define TEGs to reflect environmental conditions that effect the timing error such as e.g. the temperature.

In some embodiments, the environmental index is used together with a spatial index and two measurements are part of the same TEG only if both the spatial and the environmental indices are the same for the two measurements.

In additional or alternative embodiments, the environmental index is used together with a spatial index and a temporal index and two measurements are part of the same TEG only if both the spatial the environmental and temporal indices are the same for the two measurements.

In additional or alternative embodiments, each environmental index value corresponds to an interval in temperature. UE reporting of differential measurements that cancel timing errors.

In additional or alternative embodiments, the UE uses the information on timing error differences between different measurements to create differential measurements that cancel the timing errors or parts of the timing errors.

In additional or alternative embodiments, the UE performs TOA measurements towards a number of TRPs and groups these measurements depending on some criteria. The UE select one TRP in each group as reference TRP and creates RSTD=TOA_target_trp–TOA_reference_trp for all non reference TRPs in such a way that the target TRP and the reference TRP used to create an RSTD is in the same group. In one embodiment groups are created based on which antenna panel that was utilized for the TOA measurement. In another embodiment groups are created based on which RX-chain that was utilized for the TOA measurement. In another embodiment groups are created based on the RX-beam that was utilized for the TOA measurement. In other embodiments the grouping criteria is that of some timing TEG concept described elsewhere in this document. In some embodiments the RSTDs are signaled over LPP including information on which TRP that was used as reference TRP for each RSTD.

In additional or alternative embodiments, the UE performs TOA measurements towards a number of TRPs and groups these measurements depending on some criteria. The UE uses each TOA measurement together with uplink frsme timing information to for UE RX-TX time difference measurements. The UE select one TRP in each group as reference TRP and creates 'Differential UE RX-TX time difference'=UE_RX-TX_time_difference_target_trp– UE_RX-TX_time_difference_reference_trp for all non reference TRPs in such a way that the target TRP and the reference TRP used to create a 'Differential UE RX-TX time difference' is in the same group. In one embodiment groups are created based on which antenna panel that was utilized for the TOA measurement. In another embodiment groups are created based on which RX-chain that was utilized for the TOA measurement. In another embodiment groups are created based on the RX-beam that was utilized for the TOA measurement. In other embodiments the grouping criteria is that of some timing TEG concept described elsewhere in this document. In some embodiments the RSTDs are signaled over LPP including information on which TRP that was used as reference TRP for each RSTD. Combination of multiple types of TEGs.

TEGs can be defined for e.g. UE RX, UE TX, gNB RX and gNB TX. They can also be defined separately for different frequency bands, carriers, frequency parts or DL PRS frequency layers. Multiple such TEG types can be used at the same time. Each measurement will then be associated to one spatial and one temporal index for each TEG type applicable to the measurement and will be part of one TEG for each applicable TEG type. Note that the UE RX, UE TX, gNB RX and gNB TX timing errors are independent of each other.

The positioning node utilizes the grouping of timing measurements into TEGs of multiple types in positioning the UE.

In additional or alternative embodiments, the positioning node positions the UE by solving an equation system with one unknown variable for the timing error of each TEG and TEG type in addition to the unknown variables for the UE position.

In additional or alternative embodiments, the positioning node forms differences of measurements in one or multiple steps that cancel or partly cancel one or more of the timing errors and positions the UE based on these differential measurements.

The margin δ is described below. In some embodiments, the margin δ is preconfigured. In additional or alternative embodiments, the margin δ is signaled to the UE/gNB by the LMF. In additional or alternative embodiments, the margin δ is signaled from the UE/gNB to the LMF. In additional or alternative embodiments, the margin δ is signaled to the UE from gNB as part of UL SRS configuration via RRC.

Note that there can be one separate margin δ for each of the timing errors (UE RX timing error, UE TX timing error, gNB RX timing error, gNB TX timing error.

In some embodiments, the margin could is signaled as a value in microseconds. In another embodiment the margin is reported as one value to be chosen from a finite list of possible specified margin values. The list could be fixed (e.g. by specifications) or communicated in advance by either the LMF or the UE/gnodeB.

FIG. 5 illustrates an example where δ is provided by LMF to UE via LPP in assistance data for multi-RTT procedure. The IE NR-Multi-RTT-ProvideAssistanceData is used by the location server to provide assistance data to enable UE assisted NR Multi-RTT. It may also be used to provide NR Multi-RTT positioning specific error reason.

FIG. 6 illustrates another example provided as part of RRC Configuration as part of UL SRS Configuration.

Embodiments to control TEG reporting in case of changes impacting the delay estimate are described below.

In some cases, the UE may perform changes/adjustments of one or more parameters which are impacting the delay estimate deciding TEG assignment. For example, a UE may adjust timing related parameters (e.g., to compensate for timer or clock drifts, environmental changes, to comply with transmit timing requirements, etc.), which may impact also the assignment to a specific TEG. Herein, we described embodiments with methods to handle the possible resulting ambiguity.

In some embodiments, if a measurement is performed and associated to a spatial index, and a timing adjustment has been made before this measurement but after the previous measurement associated to the same spatial index, and the timing adjustment result in that the timing error difference between the two measurements can not be ensured to be smaller than the margin delta then the temporal index is incremented with one modulo N–1. Note that this behavior is captured by the general criteria for incrementing the temporal index.

In additional or alternative embodiments, if a measurement is performed and associated to a spatial index, and a timing adjustment is made during this measurement, and the timing adjustment result in that the timing error difference between this measurements and previous measurements associated to the same spatial index and to the current temporal index can't be ensured to be smaller than the margin delta then the temporal index is incremented with one modulo N−1. Note that this behavior is captured by the general criteria for incrementing the temporal index.

In additional or alternative embodiments, if an SRS transmission is performed and associated to a spatial index, and a timing adjustment has been made before this SRS transmission but after the previous SRS transmission associated to the same spatial index, and the timing adjustment result in that the timing error difference between the two SRS transmissions can't be ensured to be smaller than the margin delta then the temporal index is incremented with one modulo N−1. Note that this behavior is captured by the general criteria for incrementing the temporal index. In one embodiment, if an SRS transmission is performed and associated to a spatial index, and a timing adjustment is made during this SRS transmission, and the timing adjustment result in that the timing error difference between this SRS transmission and previous SRS transmissions associated to the same spatial index and to the current temporal index can't be ensured to be smaller than the margin delta then the temporal index is incremented with one modulo N−1. Note that this behavior is captured by the general criteria for incrementing the temporal index.

In additional or alternative embodiments, the TEG cannot be changed due to any timing related adjustment during the measurement.

In additional or alternative embodiments, a UE RX TEG is defined through a combination of a temporal TEG index and a spatial TEG index. The timing measurement referred to in the subsections below can be e.g. one of the TOA measurements used to form an RSTD measurement or the UE Rx-Tx time difference measurement. For each possible RX TEG spatial index value, the UE maintains an RX TEG temporal index taking values from 0 to N where N>=1 (e.g. N=1).

In additional or alternative embodiments, the UE performs a timing measurement. The UE assigns a spatial index value to the timing measurement, e.g. based on what antenna panel and/or RX beam that was utilized to receive the signal used for the measurement. If the "RX timing error" of the timing measurement is evaluated by the UE not to be equal within a margin as the RX timing error of the previous timing measurement for the same spatial index value then the UE increases the temporal index for the same spatial index value by 1 modulo N+1 (i.e. if the temporal index is <N the UE increases the temporal index by one, otherwise the UE sets the temporal index to 0). The UE assigns the temporal index value of the spatial index to the timing measurement. The UE reports the timing measurement to the LMF over LPP including a UE RX TEG indication which includes the spatial index and the temporal index assigned by the UE to the timing measurement. In case the reported measurement is the difference of two timing measurements such as e.g. the DL RSTD measurement, then the UE includes a UE RX TEG indication for each of the two timing measurement. In one embodiment the UE reports multiple RSTD measurements for which the reference timing measurement is the same for each RSTD and the UE RX TEG indication for the reference timing measurement is included only once, applying to all RSTD measurements.

LMF DL TDOA positioning based on UE RX TEGs is described below. The LMF receives DL TDOA measurements from the UE with UE RX TEG indications including spatial and temporal indices. The LMF groups the DL TDOA measurements received from the UE in different TEGs. Two measurements are considered to be part of the same UE RX TEG if: they have the same RX TEG spatial index; they have the same RX TEG temporal index; and no measurement has been reported with the same TEG spatial index, with a different temporal index, and with a timestamp in the time interval between the timestamps of the two measurements.

The LMF uses the grouping of DL TDOA measurements into TEGs in positioning the UE.

In some embodiments, the LMF select one TRP in each UE RX TEG as reference TRP and form the time difference between each measurement with the measurement for the reference TRP in the same TEG. This cancels the timing errors within the margin δ. The LMF positions the UE based on the time differences formed.

In additional or alternative embodiments, the LMF positions the UE by solving an equation system with one unknown variable for the timing error of each UE RX TEG in addition to the unknown variables for the UE position.

Signaling embodiments for LMF DL TDOA positioning based on UE RX TEGs are described below.

FIG. 7 illustrates an example of a signaling in NR-DL-TDOA-SignalMeasurementInformation IE. In some embodiments, the RX TEG spatial index and the RX TEG temporal index are signaled by the UE to the LMF as part of the NR-DL-TDOA-SignalMeasurementInformation Information Element specified in 3GPP TS 37.355 V16.4.0. The RX TEG spatial index is given by 'nr-RxDelayGroup-SpatialIndex-r17' for the target TRP and by 'nr-Ref-RxDelayGroup-SpatialIndex-r17' for the reference TRP, each of which can take on a value between 0 and S, where the maximum value S may be dependent on a UE's capability. The RX TEG temporal index is given by 'nr-RxDelay-Group-TemporalIndex-r17' for the target TRP and by 'nr-Ref-RxDelayGroup-TemporalIndex-r17' for the reference TRP, each of which can take on a value between 0 and N, where the maximum value N may be dependent on a UE's capability. In FIG. 7, up to 3 additional DL TDOA measurements (i.e., given by 'NR-DL-TDOA-AdditionalMeasurementElement-r16') can be reported where each additional DL TDOA measurement may contain RX TEG spatial and temporal indices. This allows the UE to report additional DL TDOA measurements belonging to same or different UE RX TEGs to be reported as part of the NR-DL-TDOA-SignalMeasurementInformation Information Element.

FIG. 8 illustrates an example of a NR-DL-TDOA-SignalMeasurementInformation Information Element. In some embodiments, the RX TEG spatial index and the RX TEG temporal index are signaled by the UE to the LMF as part of the NR-DL-TDOA-SignalMeasurementInformation Information Element similar to FIG. 7. However, in FIG. 8, in the up to 3 additional DL TDOA measurements, only temporal index is reported. This allows the UE to report additional DL TDOA measurements belonging to the same RX TEG spatial index (i.e., the same RX TEG spatial index as the one reported in NR-DL-TDOA-MeasElement-r16) but with different RX TEG temporal indices as part of the NR-DL-TDOA-SignalMeasurementInformation Information Element.

LMF multi-RTT positioning based on UE RX TEGs are described below. The LMF receives UE Rx-TX time difference measurements from the UE with UE RX TEG indications including spatial and temporal indices. The LMF receives gNB Rx-TX time difference measurements from the gNBs. The LMF calculates RTT estimates as the sum of a UE Rx-TX time difference measurement and a gNB Rx-TX time difference measurements for a given UE and TRP. The LMF groups the RTT estimates based on the UE RX TEG of the UE Rx-TX time difference measurements used in the RTT calculation. Two UE Rx-TX time difference measurements are considered to be part of the same UE RX TEG if: they have the same RX TEG spatial index; they have the same RX TEG temporal index; and no measurement has been reported with the same TEG spatial index, with a different temporal index, and with a timestamp in the time interval between the timestamps of the two measurements. The LMF utilize the grouping of the RTT estimates into TEGs in positioning the UE.

In some embodiments, the LMF select one TRP in each UE RX TEG as reference TRP and form the time difference between each RTT estimate with the RTT estimate for the reference TRP in the same TEG. This cancels the timing errors within the margin δ. The LMF positions the UE based on the time differences formed.

In additional or alternative embodiments, the LMF positions the UE by solving an equation system with one unknown variable for the timing error of each UE RX TEG in addition to the unknown variables for the UE position.

Signaling embodiments for LMF multi-RTT positioning based on UE RX TEGs are described below.

FIG. 9 illustrates an example of a NR-DL-TDOA-SignalMeasurementInformation IE. In some embodiments, the RX TEG spatial index and the RX TEG temporal index are signaled by the UE to the LMF as part of the NR-Multi-RTT-SignalMeasurementInformation Information Element specified in 3GPP TS 37.355 V16.4.0. The RX TEG spatial index is given by 'nr-RxDelayGroup-SpatialIndex-r17' which can take on a value between 0 and S, where the maximum value S may be dependent on a UE's capability. The RX TEG temporal index is given by 'nr-RxDelay-Group-TemporalIndex-r17' which can take on a value between 0 and N, where the maximum value N may be dependent on a UE's capability. In this example, up to 3 additional Multi-RTT measurements (i.e., given by 'NR-Multi-RTT-AdditionalMeasurements-r16') can be reported where each additional Multi-RTT measurement may contain RX TEG spatial and temporal indices. This allows the UE to report additional Multi-RTT measurements belonging to same or different UE RX TEGs to be reported as part of the NR-Multi-RTT-SignalMeasurementInformation Information Element.

FIG. 10 illustrates an example of a NR-DL-TDOA-SignalMeasurementInformation IE. In some embodiments, the RX TEG spatial index and the RX TEG temporal index are signaled by the UE to the LMF as part of the NR-Multi-RTT-SignalMeasurementInformation Information Element similar to FIG. 10. However, in FIG. 10, in the up to 3 additional Multi-RTT measurements, only temporal index is reported. This allows the UE to report additional Multi-RTT measurements belonging to the same RX TEG spatial index (i.e., the same RX TEG spatial index as the one reported in NR-Multi-RTT-MeasElement-r16) but with different RX TEG temporal indices as part of the NR-Multi-RTT-SignalMeasurementInformation Information Element.

In some embodiments, an RX TEG is defined through a combination of a temporal TEG index and a spatial TEG index. The timing measurement referred to in the subsections below can be e.g. the RTOA measurement or the gNB Rx-Tx time difference measurements. For each possible RX TEG spatial index value the gNB maintains an RX TEG temporal index taking values from 0 to N where N>=1 (e.g. N=1).

gNB measurement and measurement reporting is described below. In some embodiments, the gNB performs a timing measurement. In additional or alternative embodiments, the gNB assigns a spatial index value to the timing measurement, e.g. based on what antenna panel and/or RX beam that was utilized to receive the signal used for the measurement. In additional or alternative embodiments, If the RX timing error of the timing measurement is evaluated by the gNB to be equal within a margin δ as the RX timing error of the previous timing measurement for the same spatial index value then the gNB increases the temporal index for the same spatial index value by 1 modulo N+1 (i.e. if the temporal index is <N the UE increases the temporal index by one, otherwise the gNB sets the temporal index to 0). In additional or alternative embodiments, the gNB assigns the temporal index value of the spatial index to the timing measurement. In additional or alternative embodiments, the gNB reports the timing measurement to the LMF over NRPPa including a TEG indication which includes the spatial index and the temporal index assigned by the gNB to the timing measurement.

LMF UL TDOA positioning based on gNB RX TEGs is described below. In some embodiments, the LMF receives RTOA measurements from the gNB with gNB RX TEG indications including spatial and temporal indices. In additional or alternative embodiments, the LMF groups the RTOA received from the gNB in different TEGs. Two measurements are considered to be part of the same gNB RX TEG if: they have the same gNB RX TEG spatial index; they have the same gNB RX TEG temporal index; and no measurement has been reported with the same gNB RX TEG spatial index, with a different gNB RX TEG temporal index, and with a timestamp in the time interval between the timestamps of the two measurements. The LMF utilize the grouping of measurements into TEGs in positioning a number of UEs.

In additional or alternative embodiments, the LMF positions the UEs by solving an equation system with one unknown variable for the timing error of each gNB RX TEG in addition to the unknown variables for the UE positions.

LMF multi RTT positioning based on gNB RX TEGs is described below.

In some embodiments, the LMF receives gNB RX-Tx time difference measurements from the gNB with gNB RX TEG indications including spatial and temporal indices. The LMF receives UE RX-Tx time difference measurements from the UE. The LMF calculates RTT estimates as the sum of a UE Rx-TX time difference measurement and a gNB Rx-TX time difference measurements for a given UE and TRP. The LMF groups the RTT estimates in different TEGs based on the gNB TX TEG of the gNB Rx-TX time difference measurement used for the RTT estimate. Two measurements are considered to be part of the same TEG if: they have the same gNB RX TEG spatial index; they have the same gNB RX TEG temporal index; and no measurement has been reported with the same gNB RX TEG spatial index, with a different gNB RX TEG temporal index, and with a timestamp in the time interval between the timestamps of the two measurements. The LMF utilize the grouping of RTT estimates into TEGs in positioning a number of UEs.

In additional or alternative embodiments, the LMF positions the UEs by solving an equation system with one unknown variable for the timing error of each gNB RX TEG in addition to the unknown variables for the UE positions.

Signaling embodiments for multi-RTT positioning based on gNB RX TEGs is described below. FIG. 11 is a table illustrating an example of signaling of gNB Rx TEG via TRP Measurement Result Information Element. In some embodiments, the gNB Rx TEG is signaled via the 'TRP Measurement Result' Information Element specified in 3GPP TS 38.455 V16.2.0. The gNB RX TEG spatial index is given by 'Spatial Index' which can take on a value between 0 and S. The gNB RX TEG temporal index is given by 'Temporal Index' which can take on a value between 0 and N.

UE TX TEG indication with a spatial and a temporal index is described below. In some embodiments, a TX TEG is defined through a combination of a temporal TEG index and a spatial TEG index. For each possible TX TEG spatial index value the UE maintains a TX TEG temporal index taking values from 0 to N where N>=1 (e.g. N=1).

UE SRS transmission and UE TX TEG reporting is described below. In some embodiments, the UE transmits an SRS for positioning. The UE assigns a spatial index value to the SRS transmission, e.g. based on what antenna panel and/or TX beam that was utilized to transmit the SRS. If the TX timing error of the SRS transmission for positioning is evaluated by the UE to be equal within a margin δ as the TX timing error of the previous SRS transmission for positioning for the same spatial index value then the UE increases the temporal index for the same spatial index value by 1 modulo N+1 (i.e. if the temporal index is <N the UE increases the temporal index by one, otherwise the UE sets the temporal index to 0). The UE assigns the temporal index value of the spatial index to the SRS transmission. The UE reports the TX TEG assigned to the SRS (including the spatial index, and the temporal index) to the LMF. In one embodiment the TX TEG is included in a NR multi-RTT measurement report together with a UE RX-TX time difference measurement coupled to the SRS transmission. In another embodiment the TX TEG assigned to the SRS transmission is reported in a separate LPP message.

LMF UL TDOA positioning based on UE TX TEGs is described below. IN some embodiments, the LMF receives timestamped RTOA measurements from the gNBs (note that the RTOA measurements have been performed by the gNB based on the reception of SRSs transmitted from the UEs). The LMF receives TX TEG indication (including the spatial index, and the temporal index) for each UE SRS transmission from the UEs over LPP. The LMF couples the TX TEG indication received from the UEs to the RTOA measurements received from the gNB based on the timestamp. The LMF groups the RTOA measurements received from the gNBs in different TEGs. Two measurements are considered to be part of the same TEG if: they have the same TX TEG spatial index; they have the same TX TEG temporal index; and no SRS transmission has been reported from the same UE with the same TEG spatial index, with a different temporal index, and with a timestamp in the time interval between the timestamps of the two measurements In additional or alternative embodiments, the LMF utilize the grouping of measurements into TEGs in positioning the UE. In additional or alternative embodiments, the LMF select one TRP in each TEG as reference TRP and form the time difference between each measurement with the measurement for the reference TRP in the same TEG. This cancels the timing errors within the margin δ. The LMF positions the UE based on the time differences formed. In additional or alternative embodiments, the LMF positions the UE by solving an equation system with one unknown variable for the timing error of each TEG in addition to the unknown variables for the UE position.

LMF multi-RTT positioning based on UE TX TEGs is described below. In some embodiments, the LMF receives timestamped gNB Rx-Tx time difference measurements from the gNBs (note that the RTOA measurements have been performed by the gNB based on the reception of SRSs transmitted from the UEs). The LMF receives UE Rx-Tx time difference measurements from the UE. The LMF receives UE TX TEG indication (including the spatial index and the temporal index) for each UE SRS transmission from the UEs over LPP. In one embodiment, this is included in the UE Rx-Tx time difference measurements. In another embodiment this is signaled in a separate message. The LMF couples the UE TX TEG indication received from the UEs to the gNB Rx-Tx time difference measurements received from the gNB based on the timestamp. The LMF calculates RTT estimates as the sum of a UE Rx-TX time difference measurement and a gNB Rx-TX time difference measurements for a given UE and TRP. The LMF groups the RTT estimates in different TEGs based on the UE TX TEG indicated by the UE. Two RTT estimates are considered to be part of the same TEG if: they have the same UE TX TEG spatial index; they have the same UE TX TEG temporal index; and no SRS transmission has been reported from the same UE with the same UE TX TEG spatial index, with a different UE TX TEG temporal index, and with a timestamp in the time interval between the timestamps of the two measurements.

In additional or alternative embodiments, the LMF utilize the grouping of measurements into TEGs in positioning the UE. In additional or alternative embodiments, the LMF select one TRP in each TEG as reference TRP and form the time difference between each RTT estimate with the RTT estimate for the reference TRP in the same TEG. This cancels the timing errors within the margin δ. The LMF positions the UE based on the time differences formed. In additional or alternative embodiments, the LMF positions the UE by solving an equation system with one unknown variable for the timing error of each TEG in addition to the unknown variables for the UE position.

gNB TX TEG indication with a spatial and a temporal index is described below. In some embodiments, a TX TEG is defined through a combination of a temporal TEG index and a spatial TEG index. For each possible TX TEG spatial index value the gNB maintains a TX TEG temporal index taking values from 0 to N where N>=1 (e.g. N=1).

gNB DL-PRS transmission and gNB TX TEG reporting is described below. In some embodiments, the gNB transmits a DL-PRS for positioning. The gNB assigns a spatial index value to the DL-PRS transmission, e.g. based on what antenna panel and/or TX beam that was utilized to transmit the DL-PRS. If the TX timing error of the DL-PRS transmission is evaluated by the gNB to be equal within a margin δ as the TX timing error of the previous DL-PRS transmission for positioning for the same spatial index value then the gNB increases the temporal index for the same spatial index value by 1 modulo N+1 (i.e. if the temporal index is <N the gNB increases the temporal index by one, otherwise the gNB sets the temporal index to 0). The gNB assigns the temporal index value of the spatial index to the DL-PRS transmission. The gNB reports the TX TEG assigned to the DL-PRS (including the spatial index and the temporal index) to the LMF. In one embodiment the TX TEG is included in a measurement report together with a UE RX-TX time difference measurement coupled to the DL-PRS transmission. In another embodiment the TX TEG assigned to the DL-PRS transmission is reported to the LMF in a separate NRPPa message.

LMF DL TDOA positioning based on gNB TX TEGs is described below. In some embodiments, the LMF receives timestamped RSTD measurements from the UEs (note that the RSTD measurements have been performed by the UEs based on the reception of DL-PRSs transmitted from the gNB). The LMF receives gNB TX TEG indication (including the spatial index and the temporal index) for each gNB DL-PRS transmission from the gNBs over NRPPa. The LMF couples the TX TEG indication received from the gNBs to the RSTD measurements received from the UEs based on the timestamp. The LMF groups the RSTD measurements received from the UEs in different TEGs. Two measurements are considered to be part of the same TEG if: they have the same TX TEG spatial index; they have the same TX TEG temporal index; and no DL-PRS transmission has been reported from the same gNB with the same TEG spatial index, with a different temporal index, and with a timestamp in the time interval between the timestamps of the two measurements. The LMF utilize the grouping of measurements into TEGs in positioning the UE.

In additional or alternative embodiments, the LMF positions the UEs by solving an equation system with one unknown variable for the timing error of each gNB TX TEG in addition to the unknown variables for the UE positions.

LMF multi-RTT positioning based on gNB TX TEGs is described below. In some embodiments, the LMF receives timestamped UE Rx-Tx time difference measurements from the UEs (note that the UE Rx-Tx time difference measurements have been performed by the UEs based on the reception of DL-PRSs transmitted from the gNB). The LMF receives gNB Rx-Tx time difference measurements from the gNBs. The LMF receives gNB TX TEG indication (including the spatial index and the temporal index) for each gNB DL-PRS transmission from the gNBs over NRPPa. In one embodiment, this is included as part of the gNB Rx-Tx time difference measurement. In another embodiment this is signalled in a separate message. The LMF couples the TX TEG indication received from the gNBs to the RSTD measurements received from the UEs based on the timestamp. The LMF groups the RSTD measurements received from the UEs in different TEGs. Two measurements are considered to be part of the same TEG if: they have the same TX TEG spatial index; they have the same TX TEG temporal index; and no DL-PRS transmission has been reported from the same gNB with the same TEG spatial index, with a different temporal index, and with a timestamp in the time interval between the timestamps of the two measurements.

The LMF utilize the grouping of measurements into TEGs in positioning the UE. In additional or alternative embodiments, the LMF positions the UEs by solving an equation system with one unknown variable for the timing error of each gNB TX TEG in addition to the unknown variables for the UE positions.

UE RX TEG indication with a spatial, frequency dependent, and a temporal index is described below. In some embodiments, a UE RX TEG is defined through a combination of at least two of the following: (1) a spatial TEG index, (2) a temporal TEG index, and (3) a frequency-dependent TEG index. The timing measurement referred to in the subsections below can be e.g. one of the TOA measurements used to form an RSTD measurement or the UE Rx-Tx time difference measurements. For each possible RX TEG spatial index value, the UE maintains an RX TEG temporal index taking values from 0 to N where N>=1 (e.g.

N=1). For each possible RX TEG spatial index value, the UE maintains frequency-dependent Rx TEG index taking values from 0 to M where M>=1 (e.g., M=1). The M frequency-dependent Rx TEG indices may, for example, be defined within any one of the following: 1) a PRS frequency layer (i.e., different frequency parts in the same PRS frequency layer associated with different frequency-dependent Rx TEG indices), 2) over multiple PRS frequency layers (i.e., different frequency parts in the same or different PRS frequency layers associated with different frequency-dependent Rx TEG indices), 2) a carrier or serving cell (i.e., different frequency parts in the same carrier or serving cell associated with different frequency-dependent Rx TEG indices), and 4) over multiple carriers or serving cells (i.e., different frequency parts in the same or different carriers or serving cells associated with different frequency-dependent Rx TEG indices).

UE measurement and measurement reporting is described below. In some embodiments, the UE performs a timing measurement. The UE assigns a spatial index value to the timing measurement, e.g. based on what antenna panel and/or RX beam that was utilized to receive the signal used for the measurement. If the "RX timing error" of the timing measurement is evaluated by the UE not to be equal within a margin $\delta$ as the RX timing error of the previous timing measurement for the same spatial index value then the UE increases the temporal index for the same spatial index value by 1 modulo N+1 (i.e. if the temporal index is <N the UE increases the temporal index by one, otherwise the UE sets the temporal index to 0). The UE assigns the temporal index value of the spatial index to the timing measurement. The UE reports the timing measurement to the LMF over LPP including a UE RX TEG indication which includes the spatial index and the temporal index assigned by the UE to the timing measurement. In case the reported measurement is the difference of two timing measurements such as e.g. the DL RSTD measurement, then the UE includes a UE RX TEG indication for each of the two timing measurement. In one embodiment the UE reports multiple RSTD measurements for which the reference timing measurement is the same for each RSTD and the UE RX TEG indication for the reference timing measurement is included only once, applying to all RSTD measurements.

In additional or alternative embodiments, the UE may perform two timing measurements corresponding to the same spatial index value and the same temporal index value in different frequency parts (e.g., two PRSs in different parts of a PRS frequency layer). If the RX timing error of the second timing measurement is evaluated by the UE not to be equal within a margin $\square$ as the RX timing error of the previous timing measurement for the same spatial index value and the same temporal index value, then the UE increases the frequency-dependent index for the same spatial index value and the same temporal index value by 1 modulo M+1 (i.e. if the frequency-dependent index is <M the UE increases the frequency-dependent index by one, otherwise the UE sets the frequency-dependent index to 0).

LMF DL TDOA positioning based on UE RX TEGs is described below. IN some embodiments, the LMF receives DL TDOA measurements from the UE with UE RX TEG indications including spatial, temporal and frequency-dependent indices. The LMF groups the DL TDOA measurements received from the UE in different TEGs. Two measurements are considered to be part of the same UE RX TEG if: 1) they have the same RX TEG spatial index; 2) they have the same RX TEG temporal index; 3) they have the same RX TEG frequency-dependent index; and 4) no measurement has been reported with the same TEG spatial index, the same RX TEG frequency-dependent index, with a different temporal index, and with a timestamp in the time interval between the timestamps of the two measurements.

The LMF utilize the grouping of DL TDOA measurements into TEGs in positioning the UE. In some embodiments, the LMF select one TRP in each UE RX TEG as reference TRP and form the time difference between each measurement with the measurement for the reference TRP in the same TEG. This cancels the timing errors within the margin δ. The LMF positions the UE based on the time differences formed.

In additional or alternative embodiments, the LMF positions the UE by solving an equation system with one unknown variable for the timing error of each UE RX TEG in addition to the unknown variables for the UE position.

Signaling embodiments for LMF DL TDOA positioning based on UE RX TEGs are described below. FIG. 12 illustrates an example of signaling in NR-DL-TDOA-SignalMeasurementInformation Information Element. In some embodiments, the RX TEG spatial index, the RX TEG temporal index, and RX delay frequency-dependent index are signalled by the UE to the LMF as part of the NR-DL-TDOA-SignalMeasurementInformation Information Element specified in 3GPP TS 37.355 V16.4.0. The RX TEG frequency-dependent index is given by 'nr-RxDelayGroup-FrequencyIndex-r17' for the target TRP and by 'nr-Ref-RxDelayGroup-FrequencyIndex-r17' for the reference TRP, each of which can take on a value between 0 and M, where the maximum value M may be dependent on a UE's capability. In FIG. 12, up to 3 additional DL TDOA measurements (i.e., given by 'NR-DL-TDOA-AdditionalMeasurementElement-r16') can be reported where each additional DL TDOA measurement may contain RX TEG spatial, temporal and frequency-dependent indices. This allows the UE to report additional DL TDOA measurements belonging to same or different UE RX TEGs to be reported as part of the NR-DL-TDOA-SignalMeasurementInformation Information Element.

FIG. 13 illustrates an example of signaling in NR-DL-TDOA-SignalMeasurementInformation Information Element. In some embodiments, the RX TEG spatial index, the RX TEG temporal index, and the RX TEG frequency-dependent index are signalled by the UE to the LMF as part of the NR-DL-TDOA-SignalMeasurementInformation Information Element similar to FIG. 12. However, in FIG. 13, in the up to 3 additional DL TDOA measurements, only temporal index and/or frequency-dependent index are reported. This allows the UE to report additional DL TDOA measurements belonging to the same RX TEG spatial index (i.e., the same RX TEG spatial index as the one reported in NR-DL-TDOA-MeasElement-r16) but with different RX TEG temporal and/or frequency-dependent indices as part of the NR-DL-TDOA-SignalMeasurementInformation Information Element.

FIG. 14 illustrates an example of signaling in NR-DL-TDOA-SignalMeasurementInformation Information Element.

The interpretation of an omitted field as in FIGS. 13-14 (and similarly for many of FIGS. 7-19) can be declared via a presence conditions in FIG. 15.

LMF multi-RTT positioning based on UE RX TEGs is described below. In some embodiments, the LMF receives UE Rx-TX time difference measurements from the UE with UE RX TEG indications including spatial and temporal indices. The LMF receives gNB Rx-TX time difference measurements from the gNBs. The LMF calculates RTT estimates as the sum of a UE Rx-TX time difference measurement and a gNB Rx-TX time difference measurements for a given UE and TRP. The LMF groups the RTT estimates based on the UE RX TEG of the UE Rx-TX time difference measurements used in the RTT calculation. Two UE Rx-Tx time difference measurements are considered to be part of the same UE RX TEG if: they have the same RX TEG spatial index; they have the same RX TEG temporal index; and they have the same RX TEG frequency-dependent index.

In additional or alternative embodiments, the LMF utilize the grouping of the RTT estimates into TEGs in positioning the UE. In additional or alternative embodiments, the LMF select one TRP in each UE RX TEG as reference TRP and form the time difference between each RTT estimate with the RTT estimate for the reference TRP in the same TEG. This cancels the timing errors within the margin δ. The LMF positions the UE based on the time differences formed. In additional or alternative embodiments, the LMF positions the UE by solving an equation system with one unknown variable for the timing error of each UE RX TEG in addition to the unknown variables for the UE position.

Signaling embodiments for LMF multi-RTT positioning based on UE RX TEGs is described below. FIG. 16 illustrates an example of signaling in NR-Multi-RTT-SignalMeasurementInformation Information Element. In some embodiments, the RX TEG spatial index, the RX TEG temporal index, and RX delay frequency-dependent index are signalled by the UE to the LMF as part of the NR-Multi-RTT-SignalMeasurementInformation Information Element specified in 3GPP TS 37.355 V16.4.0. The RX TEG frequency-dependent index is given by 'nr-RxDelayGroup-FrequencyIndex-r17' which can take on a value between 0 and M, where the maximum value M may be dependent on a UE's capability. In FIG. 16, up to 3 additional Multi-RTT measurements (i.e., given by 'NR-Multi-RTT-AdditionalMeasurementElement-r16') can be reported where each additional Multi-RTT measurement may contain RX TEG spatial, temporal and frequency-dependent indices. This allows the UE to report additional Multi-RTT measurements belonging to same or different UE RX TEGs to be reported as part of the NR-Multi-RTT-SignalMeasurementInformation Information Element.

FIG. 17 illustrates an example of signaling in NR-Multi-RTT-SignalMeasurementInformation Information Element. In some embodiments, the RX TEG spatial index, the RX TEG temporal index, and the RX TEG frequency-dependent index are signalled by the UE to the LMF as part of the NR-Multi-RTT-SignalMeasurementInformation Information Element similar to FIG. 16. However, in FIG. 17, in the up to 3 additional Multi-RTT measurements, only temporal index and/or frequency-dependent are reported. This allows the UE to report additional Multi-RTT measurements belonging to the same RX TEG spatial index (i.e., the same RX TEG spatial index as the one reported in NR-Multi-RTT-MeasElement-r16) but with different RX TEG temporal and/or frequency-dependent indices as part of the NR-Multi-RTT-SignalMeasurementInformation Information Element.

FIG. 18 illustrates an example of signaling in NR-Multi-RTT-SignalMeasurementInformation Information Element.

The flexible field inclusion in FIGS. 16-18 (and similarly in many of the other examples) can be represented with presence conditions in FIG. 15.

gNB RX TEG indication with a spatial, a frequency dependent, and a temporal index is described below. In some embodiments, a gNB RX TEG is defined through a combination of at least two of the following: (1) a spatial TEG index, (2) a temporal TEG index, and (3) a frequency-dependent TEG index. The timing measurement referred to in the subsections below can be e.g. the RTOA measurement or the gNB Rx-Tx time difference measurements. For each possible RX TEG spatial index value the gNB maintains an RX TEG temporal index taking values from 0 to N where N>=1 (e.g. N=1). For each possible RX TEG spatial index value, the gNB maintains frequency-dependent Rx TEG index taking values from 0 to M where M>=1 (e.g., M=1).

gNB measurement and measurement reporting is described below. In some embodiments, the gNB performs a timing measurement. The gNB assigns a spatial index value to the timing measurement, e.g. based on what antenna panel and/or RX beam that was utilized to receive the signal used for the measurement. If the RX timing error of the timing measurement is evaluated by the gNB to be equal within a margin δ as the RX timing error of the previous timing measurement for the same spatial index value then the gNB increases the temporal index for the same spatial index value by 1 modulo N+1 (i.e. if the temporal index is <N the UE increases the temporal index by one, otherwise the gNB sets the temporal index to 0). The gNB assigns the temporal index value of the spatial index to the timing measurement. The gNB reports the timing measurement to the LMF over NRPPa including a TEG indication which includes the spatial index and the temporal index assigned by the gNB to the timing measurement.

In additional or alternative embodiments, the gNB may perform two timing measurements corresponding to the same spatial index value and the same temporal index value in different frequency parts (e.g., two SRSs in different frequency parts within a bandwith part). If the RX timing error of the second timing measurement is evaluated by the gNB to be equal within a margin δ as the RX timing error of the previous timing measurement for the same spatial index value and the same temporal index value, then the gNB increases the frequency-dependent index for the same spatial index value and the same temporal index value by 1 modulo M+1 (i.e. if the frequency-dependent index is <M the gNB increases the frequency-dependent index by one, otherwise the gNB sets the frequency-dependent index to 0).

LMF UL TDOA positioning based on gNB RX TEGs is described below. In some embodiments, the LMF receives RTOA measurements from the gNB with gNB RX TEG indications including spatial and temporal indices. The LMF groups the RTOA received from the gNB in different TEGs. Two measurements are considered to be part of the same gNB RX TEG if: they have the same gNB RX TEG spatial index; they have the same gNB RX TEG temporal index; they have the same gNB RX TEG frequency-dependent index; and no measurement has been reported with the same TEG spatial index, the same RX TEG frequency-dependent index, with a different temporal index, and with a timestamp in the time interval between the timestamps of the two measurements. The LMF utilize the grouping of measurements into TEGs in positioning a number of UEs.

In additional or alternative embodiments, the LMF positions the UEs by solving an equation system with one unknown variable for the timing error of each gNB RX TEG in addition to the unknown variables for the UE positions.

LMF multi RTT positioning based on gNB RX TEGs is described below. In some embodiments, the LMF receives gNB RX-Tx time difference measurements from the gNB with gNB RX TEG indications including spatial and temporal indices. The LMF receives UE RX-Tx time difference measurements from the UE. The LMF calculates RTT estimates as the sum of a UE Rx-TX time difference measurement and a gNB Rx-TX time difference measurements for a given UE and TRP. The LMF groups the RTT estimates in different TEGs based on the gNB TX TEG of the gNB Rx-TX time difference measurement used for the RTT estimate. Two measurements are considered to be part of the same gNB RX TEG if: they have the same gNB RX TEG spatial index; they have the same gNB RX TEG temporal index; and they have the same gNB RX TEG frequency-dependent index. The LMF utilize the grouping of RTT estimates into TEGs in positioning a number of UEs.

In additional or alternative embodiments, the LMF positions the UEs by solving an equation system with one unknown variable for the timing error of each gNB RX TEG in addition to the unknown variables for the UE positions.

Signaling embodiments for multi-RTT positioning based on gNB RX TEGs is described below. FIG. 19 is an example of signaling of gNB Rx TEG via TRP Measurement Result Information Element. In some embodiments, the gNB Rx TEG is signaled via the 'TRP Measurement Result' Information Element specified in 3GPP TS 38.455 V16.2.0. The gNB RX TEG spatial index is given by 'Spatial Index' which can take on a value between 0 and S. The gNB RX TEG temporal index is given by 'Temporal Index' which can take on a value between 0 and N. The gNB Rx TEG frequency-dependent index is given by 'Frequency Index' which can take on a value between 0 and M.

UE TX TEG indication with a spatial a frequency dependent and a temporal index is described below. In some embodiments, a UE TX TEG is defined through a combination of at least two of the following: (1) a spatial TEG index, (2) a temporal TEG index, and (3) a frequency-dependent TEG index. For each possible TX TEG spatial index value the UE maintains a TX TEG temporal index taking values from 0 to N where N>=1 (e.g. N=1). For each possible RX TEG spatial index value, the UE maintains frequency-dependent Rx TEG index taking values from 0 to M where M>=1 (e.g., M=1).

UE SRS transmission and UE TX TEG reporting is described below. In some embodiments, the UE transmits an SRS for positioning. The UE assigns a spatial index value to the SRS transmission, e.g. based on what antenna panel and/or TX beam that was utilized to transmit the SRS. If the TX timing error of the SRS transmission for positioning is evaluated by the UE to be equal within a margin as the TX timing error of the previous SRS transmission for positioning for the same spatial index value then the UE increases the temporal index for the same spatial index value by 1 modulo N+1 (i.e. if the temporal index is <N the UE increases the temporal index by one, otherwise the UE sets the temporal index to 0). The UE assigns the temporal index value of the spatial index to the SRS transmission.

In additional or alternative embodiments, if the TX timing error is of the SRS transmission for positioning is evaluated by the UE to be equal within a margin δ as the TX timing error of the previous SRS transmission for positioning for the same spatial index value and the same temporal index value, then the UE increases the frequency-dependent index for the same spatial index value and the same temporal index value by 1 modulo M+1 (i.e. if the frequency-dependent index is <M the UE increases the frequency-dependent index by one, otherwise the UE sets the frequency-dependent index to 0). In these embodiments, the UE assigns the frequency-dependent index value corresponding to the spatial index and the temporal index to the SRS transmission.

In additional or alternative embodiments, the UE reports the TX TEG assigned to the SRS (including the spatial index, the temporal index, and/or the frequency-dependent index) to the LMF. In one embodiment the TX TEG is included in a NR multi-RTT measurement report together with a UE RX-TX time difference measurement coupled to the SRS transmission. In another embodiment the TX TEG assigned to the SRS transmission is reported in a separate LPP message.

LMF UL TDOA positioning based on UE TX TEGs is described below. In some embodiments, the LMF receives timestamped RTOA measurements from the gNBs (note that the RTOA measurements have been performed by the gNB based on the reception of SRSs transmitted from the UEs). The LMF receives TX TEG indication (including the spatial index, the temporal index, and/or the frequency-dependent index) for each UE SRS transmission from the UEs over LPP. The LMF couples the TX TEG indication received from the UEs to the RTOA measurements received from the gNB based on the timestamp. The LMF groups the RTOA measurements received from the gNBs in different TEGs. Two measurements are considered to be part of the same TEG if: they have the same TX TEG spatial index; they have the same TX TEG temporal index; and they have the same TX TEG frequency-dependent index. The LMF utilize the grouping of measurements into TEGs in positioning the UE.

In additional or alternative embodiments, the LMF select one TRP in each TEG as reference TRP and form the time difference between each measurement with the measurement for the reference TRP in the same TEG. This cancels the timing errors within the margin δ. The LMF positions the UE based on the time differences formed.

In additional or alternative embodiments, the LMF positions the UE by solving an equation system with one unknown variable for the timing error of each TEG in addition to the unknown variables for the UE position.

LMF multi-RTT positioning based on UE TX TEGs is described below. In some embodiments, the LMF receives timestamped gNB Rx-Tx time difference measurements from the gNBs (note that the RTOA measurements have been performed by the gNB based on the reception of SRSs transmitted from the UEs). The LMF receives UE Rx-Tx time difference measurements from the UE. The LMF receives UE TX TEG indication (including the spatial index, the temporal index, and/or frequency-dependent index) for each UE SRS transmission from the UEs over LPP. In one embodiment, this is included in the UE Rx-Tx time difference measurements. In another embodiment this is signaled in a separate message. The LMF couples the UE TX TEG indication received from the UEs to the gNB Rx-Tx time difference measurements received from the gNB based on the timestamp. The LMF calculates RTT estimates as the sum of a UE Rx-TX time difference measurement and a gNB Rx-TX time difference measurements for a given UE and TRP. The LMF groups the RTT estimates in different TEGs based on the UE TX TEG indicated by the UE. Two RTT estimates are considered to be part of the same TEG if: they have the same TX TEG spatial index; they have the same TX TEG temporal index; and they have the same TX TEG frequency-dependent index. The LMF utilize the grouping of measurements into TEGs in positioning the UE.

In additional or alternative embodiments, the LMF select one TRP in each TEG as reference TRP and form the time difference between each RTT estimate with the RTT estimate for the reference TRP in the same TEG. This cancels the timing errors within the margin δ. The LMF positions the UE based on the time differences formed. In additional or alternative embodiments, the LMF positions the UE by solving an equation system with one unknown variable for the timing error of each TEG in addition to the unknown variables for the UE position.

gNB TX TEG indication with a spatial a frequency dependent and a temporal index is described below. In some embodiments, a gNB TX TEG is defined through a combination of at least two of the following: (1) a spatial TEG index, (2) a temporal TEG index, and (3) a frequency-dependent TEG index. For each possible TX TEG spatial index value the gNB maintains a TX TEG temporal index taking values from 0 to N where N>=1 (e.g. N=1). For each possible TX TEG spatial index value, the gNB maintains frequency-dependent Tx TEG index taking values from 0 to M where M>=1 (e.g., M=1).

gNB DL-PRS transmission and gNB TX TEG reporting is described below. In some embodiments, the gNB transmits a DL-PRS for positioning. The gNB assigns a spatial index value to the DL-PRS transmission, e.g. based on what antenna panel and/or TX beam that was utilized to transmit the DL-PRS. If the TX timing error of the DL-PRS transmission is evaluated by the gNB to be equal within a margin δ as the TX timing error of the previous DL-PRS transmission for positioning for the same spatial index value then the gNB increases the temporal index for the same spatial index value by 1 modulo N+1 (i.e. if the temporal index is <N the gNB increases the temporal index by one, otherwise the gNB sets the temporal index to 0). The gNB assigns the temporal index value of the spatial index to the DL-PRS transmission.

In additional or alternative embodiments, if the TX timing error is of the DL-PRS transmission is evaluated by the gNB to be equal within a margin δ as the TX timing error of the previous DL-PRS transmission for the same spatial index value and the same temporal index value, then the gNB increases the frequency-dependent index for the same spatial index value and the same temporal index value by 1 modulo M+1 (i.e. if the frequency-dependent index is <M the UE increases the frequency-dependent index by one, otherwise the UE sets the frequency-dependent index to 0). In these embodiments, the gNB assigns the frequency-dependent index value corresponding to the spatial index and the temporal index to the SRS transmission. The gNB reports the TX TEG assigned to the DL-PRS (including the spatial index, the temporal index, and/or the frequency-dependent index) to the LMF. In one embodiment the TX TEG is included in a measurement report together with a UE RX-TX time difference measurement coupled to the DL-PRS transmission. In another embodiment the TX TEG assigned to the DL-PRS transmission is reported to the LMF in a separate NRPPa message.

LMF DL TDOA positioning based on gNB TX TEGs is described below. In some embodiments, the LMF receives timestamped RSTD measurements from the UEs (note that the RSTD measurements have been performed by the UEs based on the reception of DL-PRSs transmitted from the gNB). The LMF receives gNB TX TEG indication (including the spatial index, the temporal index, and/or the frequency-dependent index) for each gNB DL-PRS transmission from the gNBs over NRPPa. The LMF couples the TX TEG indication received from the gNBs to the RSTD measurements received from the UEs based on the timestamp. The LMF groups the RSTD measurements received from the UEs in different TEGs. Two measurements are considered to be part of the same TEG if: they have the same TX TEG spatial index; they have the same TX TEG temporal index; and they have the same TX TEG frequency-dependent index. The LMF utilize the grouping of measurements into TEGs in positioning the UE.

In additional or alternative embodiments, the LMF positions the UEs by solving an equation system with one unknown variable for the timing error of each gNB TX TEG in addition to the unknown variables for the UE positions.

LMF multi-RTT positioning based on gNB TX TEGs is described below. In some embodiments, the LMF receives timestamped UE Rx-Tx time difference measurements from the UEs (note that the UE Rx-Tx time difference measurements have been performed by the UEs based on the reception of DL-PRSs transmitted from the gNB). The LMF receives gNB Rx-Tx time difference measurements from the gNBs. The LMF receives gNB TX TEG indication (including the spatial index, the temporal index, and/or frequency-dependent index) for each gNB DL-PRS transmission from the gNBs over NRPPa. In one embodiment, this is included as part of the gNB Rx-Tx time difference measurement. In another embodiment this is signalled in a separate message. The LMF couples the TX TEG indication received from the gNBs to the RSTD measurements received from the UEs based on the timestamp. The LMF groups the RSTD measurements received from the UEs in different TEGs. Two measurements are considered to be part of the same TEG if: they have the same TX TEG spatial index; they have the same TX TEG temporal index; and they have the same TX TEG frequency-dependent index. The LMF utilize the grouping of measurements into TEGs in positioning the UE.

In additional or alternative embodiments, the LMF positions the UEs by solving an equation system with one unknown variable for the timing error of each gNB TX TEG in addition to the unknown variables for the UE positions.

Combining methods for mitigating UE/gNB RX/TX timing errors is described below. In some embodiments, the methods for mitigating UE RX timing errors, gNB RX timing errors, UE TX timing errors, and gNB TX timing errors can be combined. In additional or alternative embodiments, for DL TDOA positioning one can combine the methods for mitigating UE RX timing errors and gNB TX timing errors. In additional or alternative embodiments, for UL TDOA positioning one can combine the methods for mitigating UE TX timing errors and gNB RX timing errors. In additional or alternative embodiments, for multi-RTT positioning one can combine all the methods, i.e. the methods for mitigating UE RX timing errors, gNB RX timing errors, UE TX timing errors, and gNB TX timing errors, or a subset of these four methods.

In additional or alternative embodiments, in combining two or more of the methods the LMF will utilize the knowledge about the timing groups (including timing group spatial and temporal indices) associated to each measurement in positioning the UE.

In additional or alternative embodiments, the LMF will utilize this timing group knowledge to form measurement differences that cancel some of the timing errors. The LMF next positions the UEs by solving an equation system with an unknown variable for the remaining (not cancelled) timing errors in addition to the unknown variables for the UE positions.

In additional or alternative embodiments, the LMF positions the UE by solving an equation system with one unknown variable for the timing error of each TEG in addition to the unknown variables for the UE position.

Operations of a communication device (implemented using the structure of the block diagram of FIG. 25 will now be discussed with reference to the flow charts of FIGS. 20-23 according to some embodiments of inventive concepts. For example, modules may be stored in memory 4130 of FIG. 25, and these modules may provide instructions so that when the instructions of a module are executed by respective communication device processing circuitry 4120, processing circuitry 4120 performs respective operations of the flow charts. Although FIGS. 20-23 are largely described below as being performed by a communication device, similar operations can be performed by a RAN node (e.g., RAN node 4160).

FIG. 20 illustrates operations performed by an entity (e.g., a communication device or a RAN node) in a communications network that includes a network node. At block 2010, processing circuitry 4120 determines at least one potential margin from a predetermined plurality of potential margins. In some examples, each potential margin of the plurality of potential margins is a potential maximum margin between two measurements based on positioning related reference signals or transmissions of positioning related reference signals. At block 2020, processing circuitry 4120 transmits, via interface 4114, an indication of the at least one potential margin to the network node. At block 2030, processing circuitry 4120 determines a margin from the at least one potential margin. At block 2040, processing circuitry 4120 performs an action. At block 2050, processing circuitry 4120 determines a TEG associated with the action based on the margin.

In some embodiments, determining the at least one potential margin includes determining a single potential margin from the predetermined plurality of potential margins. In additional or alternative embodiments, determining the margin includes determining that the single potential margin is the margin. In additional or alternative embodiments, transmitting the indication of the at least one potential margin to the network node includes transmitting an indication that the single potential margin is the margin.

In additional or alternative embodiments, determining the margin includes, responsive to transmitting the indication of the at least one potential margin to the network node, receiving an indication of a subset of the at least one potential margin; and determining the margin from the subset of the at least one potential margin.

In additional or alternative embodiments, the predetermined plurality of potential margins includes a list of potential margins specified in a radio access technology, RAT, standard followed by the communications network.

In additional or alternative embodiments, performing the action includes at least one of: performing a first measurement associated with a channel between a communication device and the communications network; performing a transmission of a first sounding reference signal, SRS, from a communication devise to the communications network; and performing a transmission of a first positioning reference signal, PRS, from node in the communication network to a communication device.

In additional or alternative embodiments, determining the TEG associated with the action includes at least one of: determining whether a timing error difference between the first measurement and a second measurement is within the margin; determining whether a timing error difference between the first SRS transmission and a second SRS transmission is within the margin; and determining the TEG associated with the action comprises determining whether a timing error difference between the first PRS transmission and a second PRS transmission is within the margin.

FIG. 21 illustrates operations (e.g., additionally or alternatively to the operations illustrated in FIG. 20) performed by an entity (e.g., a communication device or a RAN node) in a communications network that includes a network node. At block 2110, processing circuitry 4120 performs a first action. At block 2120, processing circuitry 4120 determines whether a difference between a first time associated with when the first action is performed and a second time associated with when a second action is performed exceeds a threshold. At block 2130, processing circuitry 4120 determines a TEG associated with the first action based on whether the difference exceeds the threshold.

In some embodiments, the first time is indicated in a first timestamp associated with the first action. In additional or alternative embodiments, the second time is indicated in a second timestamp associated with the second action.

FIG. 22 illustrates operations (e.g., additionally or alternatively to the operations illustrated in FIGS. 20-21) performed by an entity (e.g., a communication device or a RAN node) in a communications network that includes a network node. At block 2340, processing circuitry 4120 performs a first action. At block 2350, processing circuitry 4120 determines a temporal TEG index associated with the action. At block 2360, processing circuitry 4120 transmits, via interface 4114, a report to the network node. The report indicates the action is associated with the temporal TEG index.

In some embodiments, performing the action includes performing a measurement. Determining the temporal TEG index associated with the action can include associating the measurement with the temporal TEG index. In additional or alternative embodiments, the action includes transmitting a sounding reference signal ("SRS") to the network node. Determining the temporal TEG index associated with the action can include associating a transmission of the SRS with the temporal TEG index.

FIG. 23 illustrates operations (e.g., additionally or alternatively to the operations illustrated in FIGS. 20-22) performed by an entity (e.g., a communication device or a RAN node) in a communications network that includes a network node. At block 2310, processing circuitry 4120 receives, via interface 4114, a request for TEG reporting capabilities from the network node. At block 2320, processing circuitry 4120 transmits, via interface 4114, TEG reporting capabilities to the network node. In some embodiments, the TEG reporting capabilities indicate that the communication device is capable of determining a temporal TEG index associated with an action and reporting that the temporal TEG index is associated with the action to the network node.

At block 2330, processing circuitry 4120 receives, via interface 4114, configuration parameters from the network node. In some embodiments, the configuration parameters include a margin indicating a difference between different temporal TEG indices.

In additional or alternative embodiments, if the entity is a RAN node, performing the action can include transmitting a downlink positioning reference signal ("DL-PRS") to the communication device. Determining the temporal TEG index associated with the action can include associating a transmission of the DL-PRS with the temporal TEG index.

In additional or alternative embodiments, processing circuitry 4120 performs multiple actions and determines a temporal TEG index associated with each action.

In additional or alternative embodiments, determining the temporal TEG index includes determining the temporal TEG index associated with the action based on the configuration parameters received at block 2330.

At block 2352, processing circuitry 4120 determines a spatial TEG index associated with the action. At block 2354, processing circuitry 4120 determines a frequency TEG index associated with the action.

At block 2360, processing circuitry 4120 transmits, via interface 4114, a report to the network node indicating that the action is associated with the temporal TEG index. In some embodiments, transmitting the report includes transmitting a positioning measurement report to the network node including a positioning measurement and an associated temporal TEG index. In additional or alternative embodiments, transmitting the report includes transmitting a SRS transmission report to the network node indicating that a SRS transmission is associated with a temporal TEG index.

In additional or alternative embodiments, the report includes a spatial TEG index associated with the action and/or a frequency TEG index associated with the action.

In additional or alternative embodiments, the network node includes a RAN node (e.g., node 4160). In additional or alternative embodiments, if the entity is a RAN node, the network node includes a CN node (e.g., node 4160). In some examples, the CN node is a LMF node.

Various operations from the flow chart of FIG. 23 may be optional with respect to some embodiments of communication devices and related methods. In some examples, in regards to Example Embodiment 1, below, blocks 2310, 2320, 2330, 2352, and 2354 are optional. In other examples, in regards to Example Embodiment 9, below, blocks 2330, 2340, 2350, 2352, 2354, and 2360 are optional.

Operations of a network node (implemented using the structure of the block diagram of FIG. 25 will now be discussed with reference to the flow chart of FIG. 24 according to some embodiments of inventive concepts. For example, modules may be stored in memory 4180 of FIG. 25, and these modules may provide instructions so that when the instructions of a module are executed by respective communication device processing circuitry 4170, processing circuitry 4170 performs respective operations of the flow chart. Although FIG. 24 is described below as being performed by RAN node 4160, similar operations can be performed by a network node (e.g., CN node 4160).

FIG. 24 illustrates an example of operations performed by a network node (e.g., a RAN node or a CN node) in a communications network that includes an entity (e.g., a communication device or a RAN node). At block 2410, processing circuitry 4170 transmits, via interface 4190, a request for TEG reporting capabilities to the communication device. At block 2420, processing circuitry 4170 receives, via interface 4190, TEG reporting capabilities from the communication device. In some embodiments, the TEG reporting capabilities indicate that the communication device is capable of determining a temporal TEG index associated with an action and reporting that the temporal TEG index is associated with the action to the network node.

At block 2430, processing circuitry 4170 transmits, via interface 4190, configuration parameters to the communication device. In some embodiments, the configuration parameters include at least one of: a margin indicating a difference between different temporal TEG indices; and a request that the communication device associate the temporal TEG index with the action and report the temporal TEG index to the network node.

At block 2440, processing circuitry 4170 receives, via interface 4190, a report from the communication device indicating that the action performed by the communication device is associated with a temporal TEG index. In some embodiments, the action includes a positioning measurement performed by the communication device and receiving the report includes receiving a positioning measurement report from the communication device including the positioning measurement and the temporal TEG index. In additional or alternative embodiments, the action includes a SRS transmission transmitted by the communication device and receiving the report includes receiving a SRS transmission report from the communication device, the SRS transmission report indicating that the SRS transmission is associated with the temporal TEG index.

In additional or alternative embodiments, when the network node is a CN node and the entity is a RAN node, the action includes a DL-PRS transmission transmitted by the RAN node to a communication device and receiving the report includes receiving DL-PRS transmission report from the RAN node. The DL-PRS transmission report can indicate that the DL-PRS transmission is associated with the TEG index.

In additional or alternative embodiments, receiving the report includes receiving a report further indicating at least one of: a spatial TEG index associated with the action; and a frequency TEG index associated with the action.

At block 2450, processing circuitry 4170 determines a position of the communication device based on the temporal TEG index associated with the action. In some embodiments, the temporal TEG index includes a first temporal TEG index of a plurality of temporal TEG indices; the action includes a first action of a plurality of actions; and receiving the report includes receiving the report indicating a temporal TEG index associated with each action of the plurality of actions. Determining the position of the communication device can include determining whether a first action of the plurality of actions and a second action of the plurality of actions are part of a common TEG based on a first temporal TEG index associated with the first action and a second temporal TEG index associated with the second action.

In additional or alternative embodiments, determining whether the first action and the second action are part of the common TEG includes determining that the first action and the second action are part of the common TEG based on determining that the first action and the second action: share a common spatial TEG index; share a common temporal TEG index; share a common frequency TEG index; and that no other action has been reported with the common TEG index, the common temporal TEG index, the common frequency TEG index, and with a timestamp in a time interval between timestamps associated with the first action and the second action.

Various operations from the flow chart of FIG. 24 may be optional with respect to some embodiments of communication devices and related methods. In some examples, in regards to Example Embodiment 11, below, blocks 2410, 2420, and 2430 are optional. In other examples, in regards to Example Embodiment 19, below, blocks 2430, 2440, and 2450 are optional.

Example embodiments are discussed below.

Embodiment 1. A method of operating an entity in a communications network that includes a network node, the method comprising: performing (2340) an action; determining (2350) a temporal timing error group, TEG, index associated with the action; and transmitting (2360) a report to the network node, the report indicating that the action is associated with the temporal TEG index.

Embodiment 2. The method of Embodiment 1, wherein the entity is a communication device.

Embodiment 3. The method of Embodiment 2, wherein performing the action comprises performing a positioning measurement, wherein determining the temporal TEG index associated with the action comprises associating the positioning measurement with the temporal TEG index, and wherein transmitting the report comprises transmitting a positioning measurement report to the network node including the positioning measurement and the temporal TEG index.

Embodiment 4. The method of Embodiment 2, wherein performing the action comprises transmitting a sounding reference signal, SRS, to the network node, wherein determining the temporal TEG index associated with the action comprises associating a transmission of the SRS with the temporal TEG index, and wherein transmitting the report comprises transmitting a SRS transmission report to the network node, the SRS transmission report indicating that the SRS transmission is associated with the temporal TEG index.

Embodiment 5. The method of Embodiment 1, wherein the entity is a random access network, RAN, node, and wherein the network node is a core network, CN, node.

Embodiment 6. The method of Embodiment 5, wherein performing the action comprises transmitting a downlink positioning reference signal, DL-PRS, to a communication device, wherein determining the TEG index comprises determining the TEG index associated with transmission of the DL-PRS, and wherein transmitting the report comprises transmitting the report to the CN node via a New Radio Positioning Protocol A, NRPPa, interface.

Embodiment 7. The method of any of Embodiments 1-6, wherein the temporal TEG index comprises one temporal TEG index of a plurality of temporal TEG indices, wherein performing the action comprises performing a plurality of actions, and wherein determining the temporal TEG index comprises determining a temporal TEG index of the plurality of temporal TEG indices for each action of the plurality of actions.

Embodiment 8. The method of Embodiment 7, wherein determining the temporal TEG index for each action of the plurality of actions comprises determining that a first action of the plurality of actions and a second action of the plurality of actions are associated with a common temporal TEG index of the plurality of temporal TEG indices based on a maximum timing error difference between the first action and the second action being evaluated as smaller than a margin threshold value.

Embodiment 9. The method of any of Embodiments 1-8, further comprising: receiving (2330) configuration parameters from the network node, wherein determining the temporal TEG index comprises determining the temporal TEG index associated with the action based on the configuration parameters.

Embodiment 10. The method of Embodiment 9, wherein the configuration parameter comprises a margin indicating a maximum timing error difference between two actions considered to be associated to a common temporal TEG index.

Embodiment 11. The method of any of Embodiments 1-10, further comprising: determining (2352) a spatial TEG index associated with the action, wherein transmitting the report to the network node comprises transmitting the report indicating that the action is associated with the spatial TEG index.

Embodiment 12. The method of any of Embodiments 1-11, further comprising: determining (2354) a frequency TEG index associated with the action, wherein transmitting the report to the network node comprises transmitting the report indicating that the action is associated with the frequency TEG index.

Embodiment 13. A method of operating an entity in a communications network that includes a network node, the method comprising: receiving (2310) a request for timing error group, TEG, reporting capabilities from the network node; and responsive to receiving the request, transmitting (2320) TEG reporting capabilities to the network node, the TEG reporting capabilities indicating that the entity is capable of determining a temporal TEG index associated with an action and reporting that the temporal TEG index is associated with the action to the network node.

Embodiment 14. The method of Embodiment 13, further comprising any of the operations of Embodiments 1-12.

Embodiment 15. A method of operating a network node in a communications network that includes an entity, the method comprising: receiving (2440) a report from the entity, the report indicating that an action performed by the entity is associated with a temporal timing error group, TEG, index; and determining (2450) a position of a communication device based on the temporal TEG index associated with the action.

Embodiment 16. The method of Embodiment 15, wherein the entity is the communication device.

Embodiment 17. The method of Embodiment 16, wherein the action comprises a positioning measurement performed by the communication device, and wherein receiving the report comprises receiving a positioning measurement report from the communication device including the positioning measurement and the temporal TEG index.

Embodiment 18. The method of Embodiment 16, wherein the action comprises a sounding reference signal, SRS, transmission transmitted by the communication device, and wherein receiving the report comprises receiving a SRS transmission report from the communication device, the SRS transmission report indicating that the SRS transmission is associated with the temporal TEG index.

Embodiment 19. The method of Embodiment 15, wherein the entity is a radio access network, RAN, node, and wherein the network node is a core network, CN, node.

Embodiment 20. The method of Embodiment 19, wherein the action comprises a downlink positioning reference signal, DL-PRS, transmission by the RAN node to the communication device wherein receiving the report comprises receiving a DL-PRS transmission report from the RAN node, the DL-PRS transmission report indicating that the DL-PRS transmission is associated with the temporal TEG index.

Embodiment 21. The method of any of Embodiments 15-20, further comprising: transmitting (2430) configuration parameters to the entity, the configuration parameters including at least one of: a margin indicating a maximum timing error difference between two actions considered to be associated to a common temporal TEG index; and a request that the entity associate the temporal TEG index with the action and report the temporal TEG index to the network node.

Embodiment 22. The method of any of Embodiments 15-21, wherein receiving the report comprises receiving a report further indicating at least one of: a spatial TEG index associated with the action; and a frequency TEG index associated with the action.

Embodiment 23. The method of any of Embodiments 15-22, wherein the temporal TEG index comprises a first temporal TEG index of a plurality of temporal TEG indices, wherein the action comprises a first action of a plurality of actions, and wherein receiving the report comprises receiving the report indicating a temporal TEG index associated with each action of the plurality of actions.

Embodiment 24. The method of Embodiment 23, wherein determining the position of the communication device comprises determining whether a first action of the plurality of actions and a second action of the plurality of actions are part of a common TEG based on a first temporal TEG index associated with the first action and a second temporal TEG index associated with the second action.

Embodiment 25. The method of Embodiment 24, wherein determining whether the first action and the second action are part of the common TEG comprises determining that the first action and the second action are part of the common TEG based on determining that the first action and the second action: share a common spatial TEG index; share a common temporal TEG index; share a common frequency TEG index; and that no other action has been reported with the common TEG index, the common temporal TEG index, the common frequency TEG index, and with a timestamp in a time interval between timestamps associated with the first action and the second action.

Embodiment 26. A method of operating a network node in a communications network that includes an entity, the method comprising: transmitting (2410) a request for timing error group, TEG, reporting capabilities to the entity; and responsive to transmitting the request, receiving (2420) TEG reporting capabilities from the entity, the TEG reporting capabilities indicating that the entity is capable of determining a temporal TEG index associated with an action and reporting that the temporal TEG index is associated with the action to the network node.

Embodiment 27. The method of Embodiment 26, further comprising any of the operations of Embodiments 15-25.

Embodiment 28. A method of operating an entity in a communications network that includes a network node, the method comprising: performing (2340) a first action; determining (2145) whether a difference between a first time associated with when the first action was performed and a second time associated with when a second action was performed exceeds a threshold; determining (2350) a timing error group, TEG, associated with the first action based on whether the difference exceeds the threshold.

Embodiment 29. The method of Embodiment 28, wherein the first time is indicated in a first timestamp associated with the first action, and wherein the second time is indicated in a second timestamp associated with the second action.

Embodiment 30. The method of any of Embodiments 28-29, further comprising any of the operations of Embodiments 1-13.

Embodiment 31. A method of operating an entity in a communications network that includes a network node, the method comprising: performing (2340) an action; determining (2350) a temporal timing error group, TEG, index associated with the action; and transmitting (2360) a report to the network node, the report indicating that the action is associated with the temporal TEG index.

Embodiment 32. The method of Embodiment 31, wherein the entity is a communication device, wherein performing the action comprises performing a positioning measurement, wherein determining the temporal TEG index associated with the action comprises associating the positioning measurement with the temporal TEG index, and wherein transmitting the report comprises transmitting a positioning measurement report to the network node including the positioning measurement and the temporal TEG index.

Embodiment 33. The method of Embodiment 31, wherein the entity is a communication device, wherein performing the action comprises transmitting a sounding reference signal, SRS, to the network node, wherein determining the temporal TEG index associated with the action comprises associating a transmission of the SRS with the temporal TEG index, and wherein transmitting the report comprises transmitting a SRS transmission report to the network node, the SRS transmission report indicating that the SRS transmission is associated with the temporal TEG index.

Embodiment 34. The method of Embodiment 31, wherein the entity is a radio access network, RAN, node, and wherein the network node is a core network, CN, node configured to perform a location management function, LMF, wherein performing the action comprises transmitting a downlink positioning reference signal, DL-PRS, to a communication device, wherein determining the temporal TEG index comprises determining the temporal TEG index associated with transmission of the DL-PRS, and wherein transmitting the report comprises transmitting the report to the CN node via a New Radio Positioning Protocol A, NRPPa, interface.

Embodiment 35. The method of any of Embodiments 31-34, wherein the temporal TEG index comprises one temporal TEG index of a plurality of temporal TEG indices, wherein performing the action comprises performing a plurality of actions, and wherein determining the temporal TEG index comprises determining a temporal TEG index of the plurality of temporal TEG indices for each action of the plurality of actions, wherein determining the temporal TEG index for each action of the plurality of actions comprises determining that a first action of the plurality of actions and a second action of the plurality of actions are associated with a common temporal TEG index of the plurality of temporal TEG indices based on a maximum timing error difference between the first action and the second action being evaluated as smaller than a margin threshold value.

Embodiment 36. The method of any of Embodiments 31-35, further comprising any of the operations of Embodiments 1-13 or 28-30.

Embodiment 37. A method of operating an entity in a communications network that includes a network node, the method comprising: receiving (2310) a request for timing error group, TEG, reporting capabilities from the network node; and responsive to receiving the request, transmitting (2320) TEG reporting capabilities to the network node, the TEG reporting capabilities indicating that the entity is capable of determining a temporal TEG index associated with an action and reporting that the temporal TEG index is associated with the action to the network node.

Embodiment 38. The method of Embodiment 37, further comprising any of the operations of Embodiments 1-13 or 28-36.

Embodiment 39. An entity (4110, 4200, 4491, 4492, 4530, 4160, 4412a-c, 4520) in a communications network that includes a network node, the communication device comprising: processing circuitry (4120, 4201, 4538); and memory (4130) coupled to the processing circuitry and having instructions stored therein that are executable by the processing circuitry to cause the entity to perform operations comprising any of the operations of Embodiments 1-14 or 28-38.

Embodiment 40. An entity (4110, 4200, 4491, 4492, 4530, 4160, 4412a-c, 4520) in a communications network that includes a network node, the entity adapted to perform any of the operations of Embodiments 1-14 or 28-38.

Embodiment 41. A computer program comprising program code to be executed by processing circuitry (4120, 4201, 4538) of an entity (4110, 4200, 4491, 4492, 4530, 4160, 4412a-c, 4520) in a communications network that includes a network node, whereby execution of the program code causes the entity to perform operations comprising any of the operations of Embodiments 1-14 or 28-38.

Embodiment 42. A computer program product comprising a non-transitory storage medium including program code to be executed by processing circuitry (4120, 4201, 4538) of an entity (4110, 4200, 4491, 4492, 4530, 4160, 4412a-c, 4520) in a communications network that includes a network node, whereby execution of the program code causes the entity to perform operations comprising any of the operations of Embodiments 1-14 or 28-38.

Embodiment 43. A network node (4160, 4412a-c, 4520) in a communications network, the network node comprising: processing circuitry (4170, 4528); and memory (4180,) coupled to the processing circuitry and having instructions stored therein that are executable by the processing circuitry to cause the network node to perform operations comprising any of the operations of Embodiments 15-27.

Embodiment 44. A network node (4160, 4412a-c, 4520) in a communications network, the network node adapted to perform any of the operations of Embodiments 15-27.

Embodiment 45. A computer program comprising program code to be executed by processing circuitry (4170, 4528) of a network node (4160, 4412a-c, 4520) in a communications network, whereby execution of the program code causes the network node to perform operations comprising any of the operations of Embodiments 15-27.

Embodiment 46. A computer program product comprising a non-transitory storage medium including program code to be executed by processing circuitry (4170, 4528) of a network node (4160, 4412a-c, 4520) in a communications network, whereby execution of the program code causes the network node to perform operations comprising any of the operations of Embodiments 15-27.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 25:
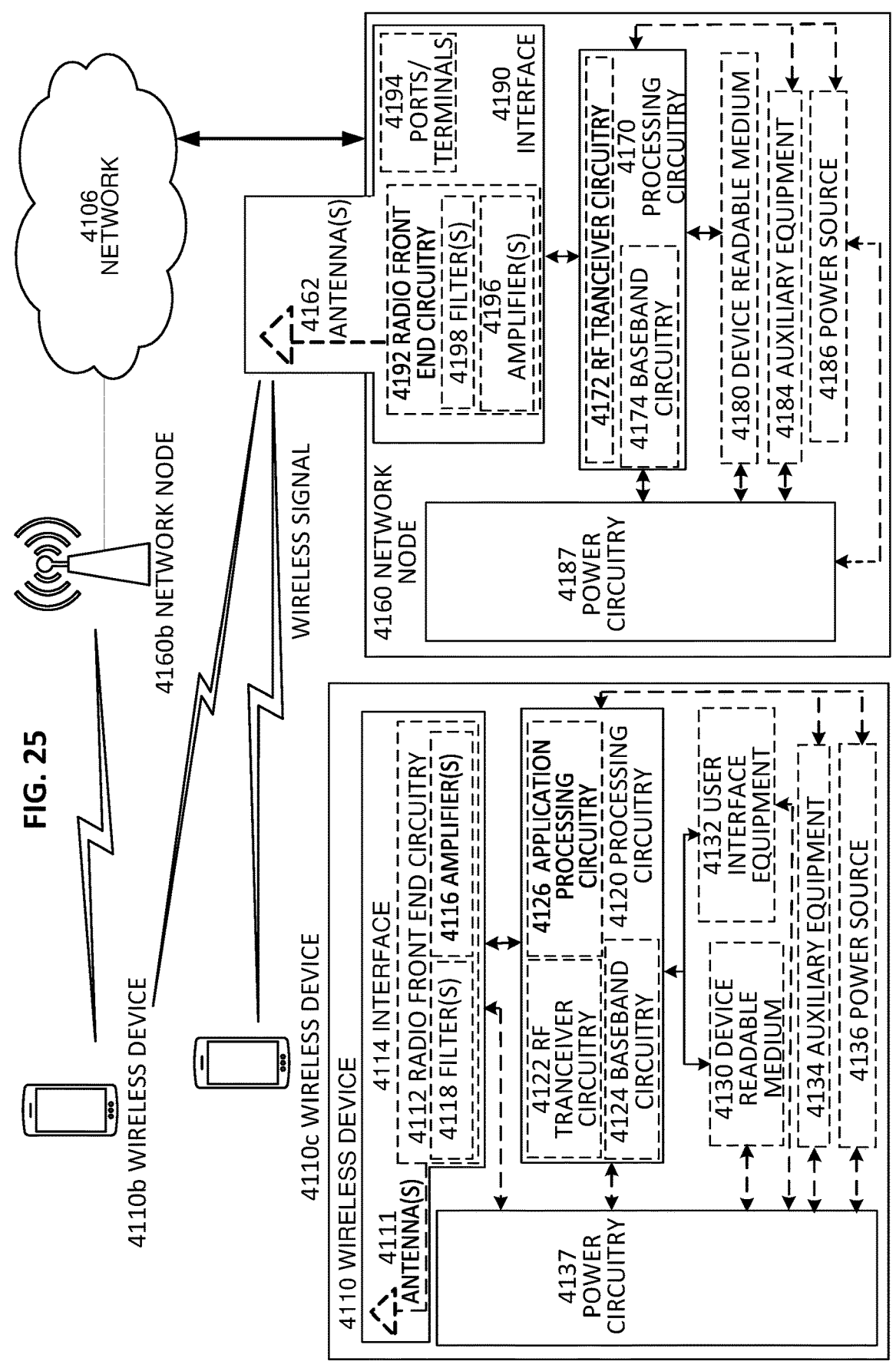
FIG. 25 is a block diagram of a wireless network in accordance with some embodiments.

FIG. 25 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 4106, network nodes 4160 and 4160b, and Wireless Devices 4110, 4110b, and 4110c (also referred to as mobile terminals, or UEs). In practice, a wireless network may further include any additional elements suitable to support communication between wireless devices or between a wireless device and another communication device, such as a landline telephone, a service provider, or any other network node or end device. Of the illustrated components, network node 4160 and wireless device (UE) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and UE 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or UEs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or UEs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 25 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (UE) refers to a device capable, configured, arranged and/or operable to communicate wirelessly with network nodes and/or other wireless devices. Unless otherwise noted, the term Wireless Device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. UE 4110 may include multiple sets of one or more of the illustrated components for different wireless technologies supported by UE 4110, such as, for example, GSM, WCDMA, LTE, NR, WiFi, WiMAX, or Bluetooth wireless technologies, just to mention a few. These wireless technologies may be integrated into the same or different chips or set of chips as other components within UE 4110.

Antenna 4111 may include one or more antennas or antenna arrays, configured to send and/or receive wireless signals, and is connected to interface 4114. In certain alternative embodiments, antenna 4111 may be separate from UE 4110 and be connectable to UE 4110 through an interface or port. Antenna 4111, interface 4114, and/or processing circuitry 4120 may be configured to perform any receiving or transmitting operations described herein as being performed by a UE. Any information, data and/or signals may be received from a network node and/or another UE. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, UE 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or UEs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other UE 4110 components, such as device readable medium 4130, UE 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of UE 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a UE may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of UE 4110, but are enjoyed by UE 4110 as a whole, and/or by end users and the wireless network generally.

Processing circuitry 4120 may be configured to perform any determining, calculating, or similar operations (e.g., certain obtaining operations) described herein as being performed by a UE. These operations, as performed by processing circuitry 4120, may include processing information obtained by processing circuitry 4120 by, for example, converting the obtained information into other information, comparing the obtained information or converted information to information stored by UE 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with UE 4110. Such interaction may be of many forms, such as visual, audial, tactile, etc. User interface equipment 4132 may be operable to produce output to the user and to allow the user to provide input to UE 4110. The type of interaction may vary depending on the type of user interface equipment 4132 installed in UE 4110. For example, if UE 4110 is a smart phone, the interaction may be via a touch screen; if UE 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into UE 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from UE 4110, and to allow processing circuitry 4120 to output information from UE 4110. User interface equipment 4132 may include, for example, a speaker, a display, vibrating circuitry, a USB port, a headphone interface, or other output circuitry. Using one or more input and output interfaces, devices, and circuits, of user interface equipment 4132, UE 4110 may communicate with end users and/or the wireless network, and allow them to benefit from the functionality described herein.

Auxiliary equipment 4134 is operable to provide more specific functionality which may not be generally performed by UEs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. UE 4110 may further comprise power circuitry 4137 for delivering power from power source 4136 to the various parts of UE 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case UE 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of UE 4110 to which power is supplied.

Figure 26:
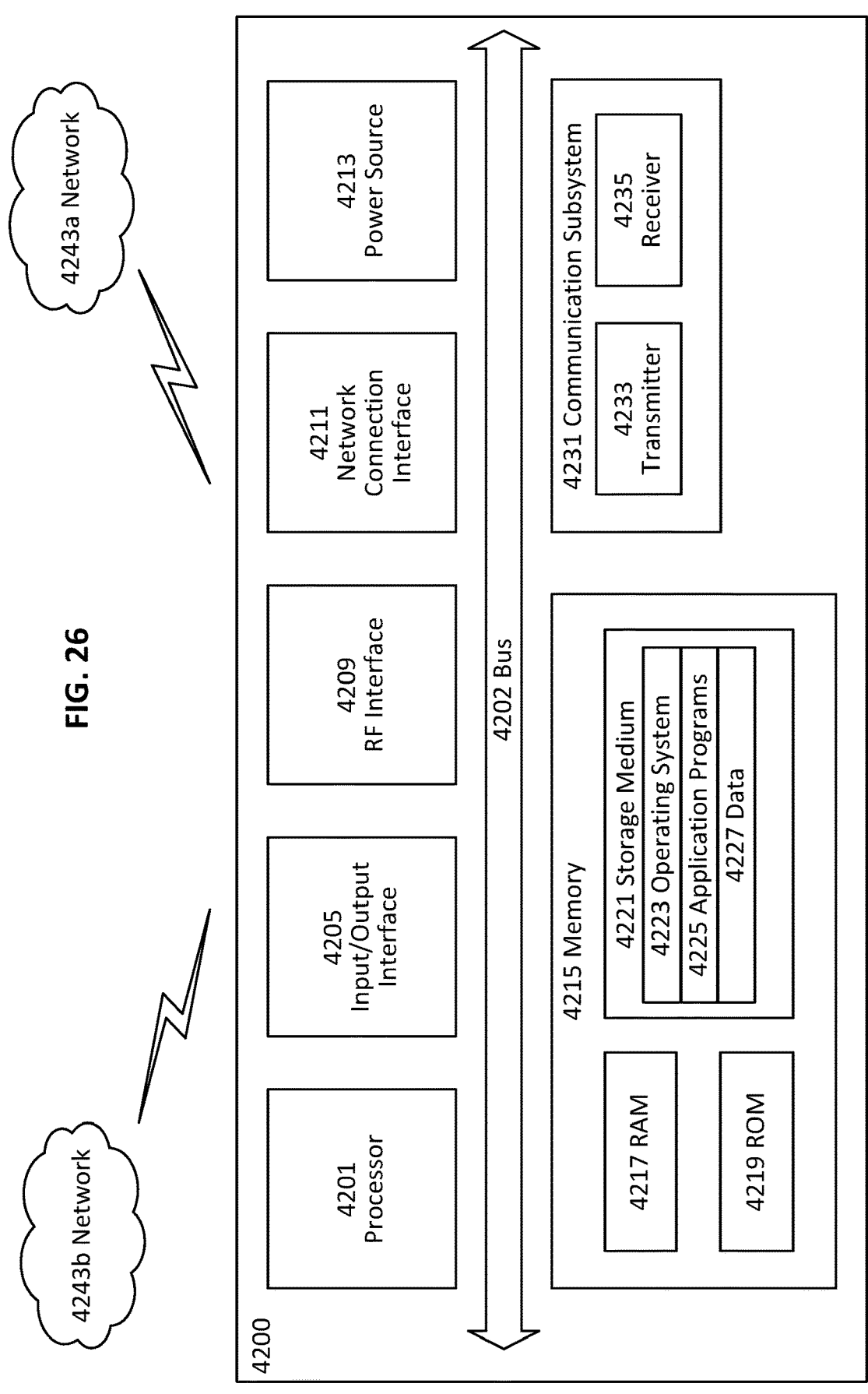
FIG. 26 is a block diagram of a user equipment in accordance with some embodiments

FIG. 26 illustrates a user Equipment in accordance with some embodiments.

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IOT UE, a machine type communication (MTC) UE, and/or an enhanced MTC (eMTC) UE. UE 4200, as illustrated in FIG. 26, is one example of a UE configured for communication in accordance with one or more communication standards promulgated by the 3rd Generation Partnership Project (3GPP), such as 3GPP's GSM, UMTS, LTE, and/or 5G standards. As mentioned previously, the term UE and UE may be used interchangeable. Accordingly, although FIG. 26 is a UE, the components discussed herein are equally applicable to a UE, and vice-versa.

In FIG. 26, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 4209 may be configured to provide a communication interface to RF components such as a transmitter, a receiver, and an antenna. Network connection interface 4211 may be configured to provide a communication interface to network 4243_a_. Network 4243_a_ may encompass wired and/or wireless networks such as a local-area network (LAN), a wide-area network (WAN), a computer network, a wireless network, a telecommunications network, another like network or any combination thereof. For example, network 4243_a_ may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 26, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200.

Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

FIG. 27 illustrates a virtualization environment in accordance with some embodiments.

FIG. 27 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 27, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 27.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 28:
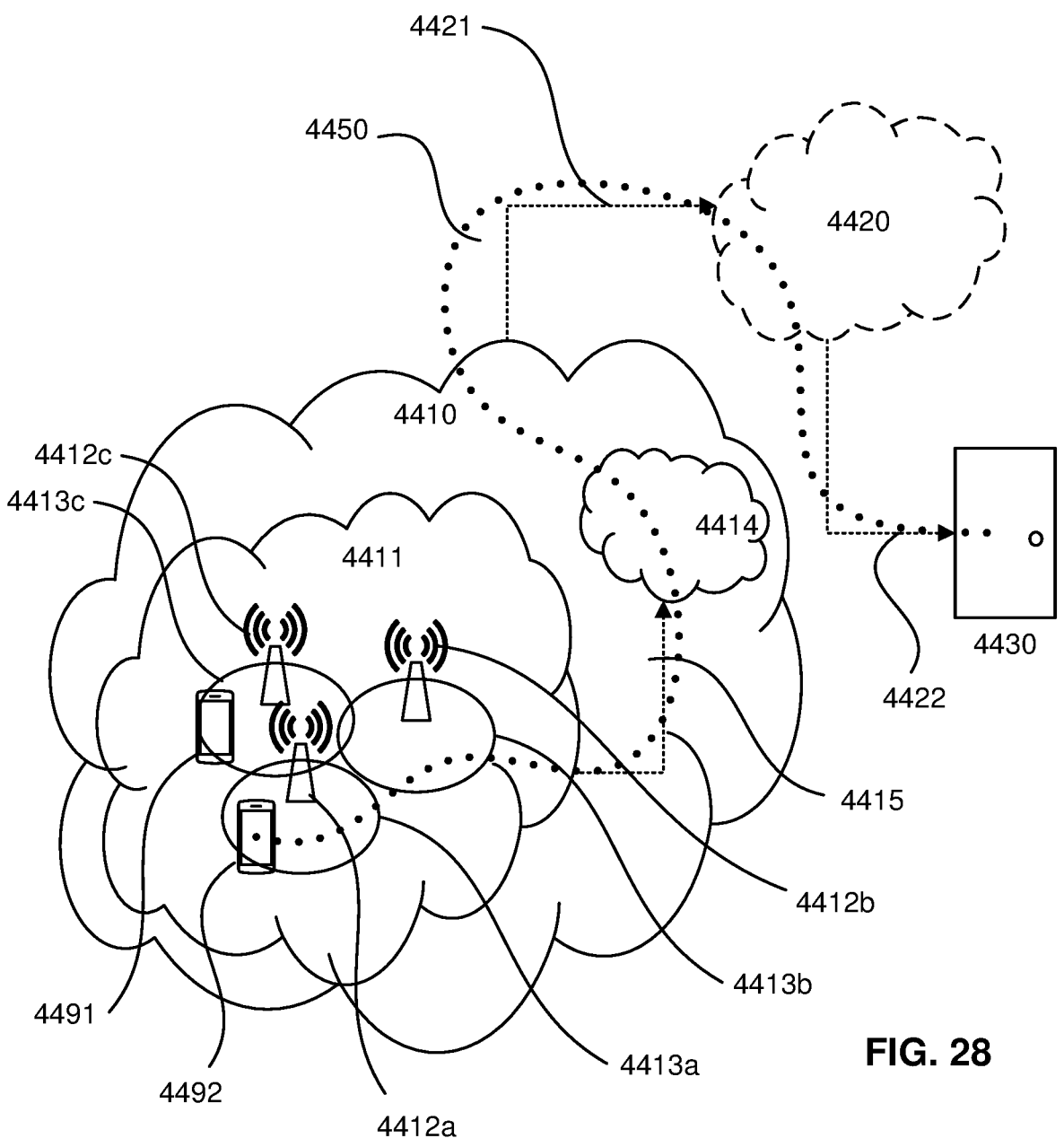
FIG. 28 is a block diagram of a telecommunication network connected via an intermediate network to a host computer in accordance with some embodiments.

FIG. 28 illustrates a telecommunication network connected via an intermediate network to a host computer in accordance with some embodiments.

With reference to FIG. 28, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 28 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 29:
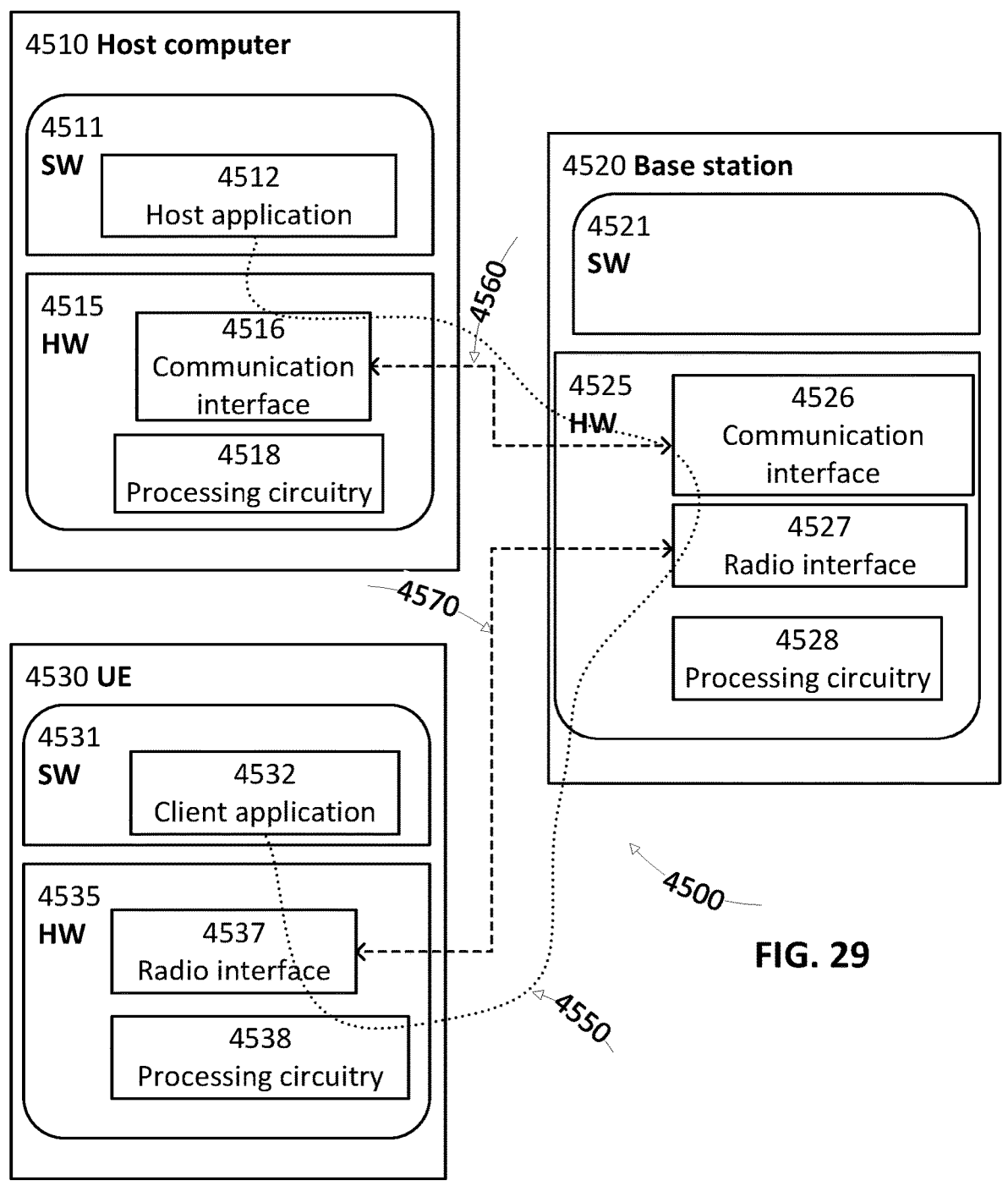
FIG. 29 is a block diagram of a host computer communicating via a base station with a user equipment over a partially wireless connection in accordance with some embodiments.

FIG. 29 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 29. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 29) served by base station 4520. Communication interface 4526 may be configured to facilitate connection 4560 to host computer 4510. Connection 4560 may be direct or it may pass through a core network (not shown in FIG. 29) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 29 may be similar or identical to host computer 4430, one of base stations 4412a, 4412b, 4412c and one of UEs 4491, 4492 of FIG. 28, respectively. This is to say, the inner workings of these entities may be as shown in FIG. 29 and independently, the surrounding network topology may be that of FIG. 28.

In FIG. 29, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. For example, the teachings of these embodiments provide OTT applications such as VR/AR, gaming or industrial IoT applications with greater positioning accuracy. In some examples the greater positioning accuracy may enable the network management systems and access functions to dynamically manage resources to be better adapted to the exact location within the access network serving area and therefore enhance the resource allocations, scheduling, etc which means that specific OTT services will be more reliable and be able to access resources as required with improved latency.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 30, 31:
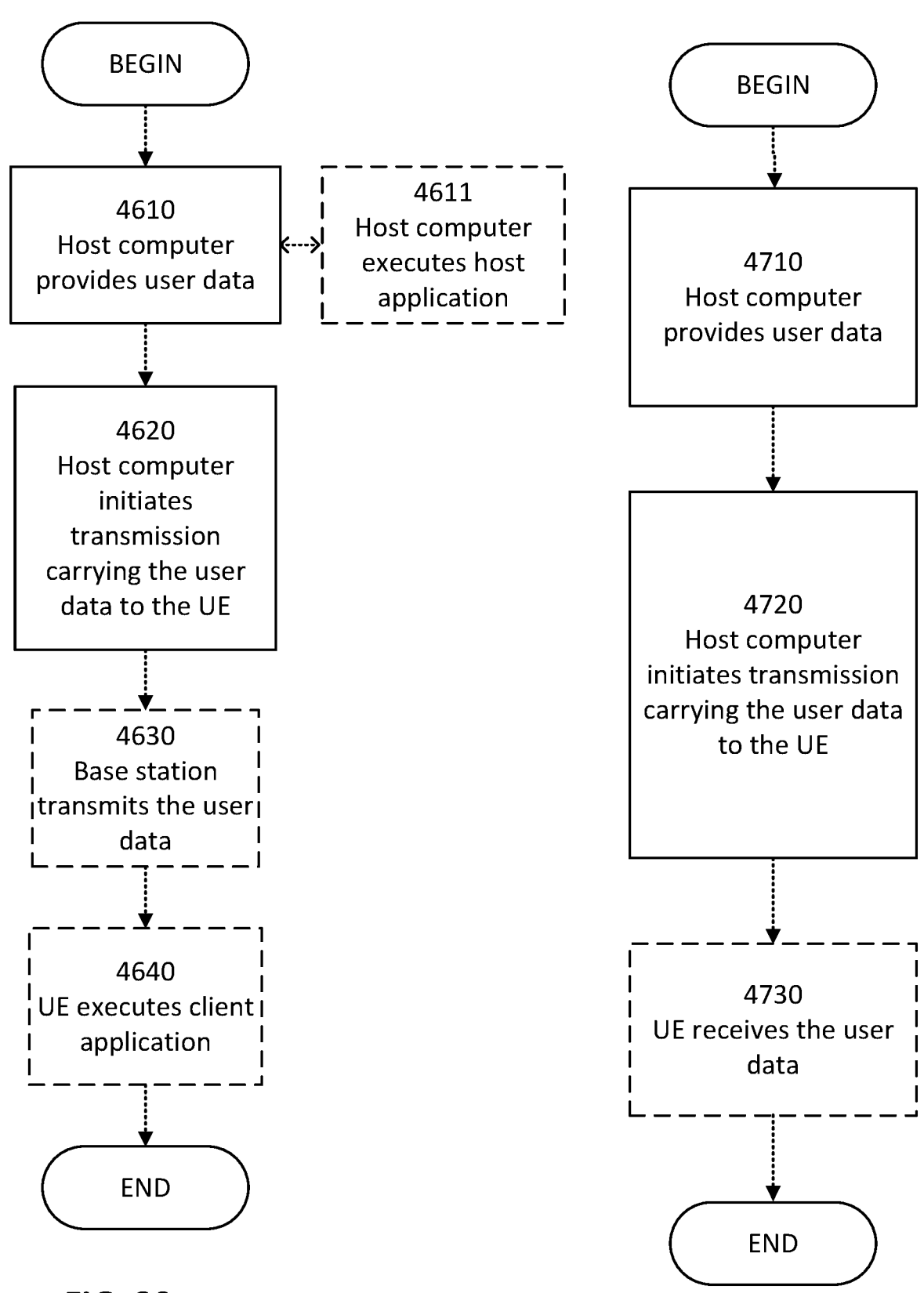
FIG. 30 is a block diagram of methods implemented in a communication system including a host computer, a base station and a user equipment in accordance with some embodiments.
FIG. 31 is a block diagram of methods implemented in a communication system including a host computer, a base station and a user equipment in accordance with some embodiments.

FIG. 30 illustrates methods implemented in a communication system including a host computer, a base station and a user equipment in accordance with some embodiments FIG. 30 is a flowchart illustrating a method implemented in a communication system, in accordance with one embodiment. The communication system includes a host computer, a base station and a UE which may be those described with reference to FIGS. 28-29. For simplicity of the present disclosure, only drawing references to FIG. 30 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 31 illustrates methods implemented in a communication system including a host computer, a base station and a user equipment in accordance with some embodiments.

FIG. 31 is a flowchart illustrating a method implemented in a communication system, in accordance with one embodiment. The communication system includes a host computer, a base station and a UE which may be those described with reference to FIGS. 28-29. For simplicity of the present disclosure, only drawing references to FIG. 31 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figures 32, 33:
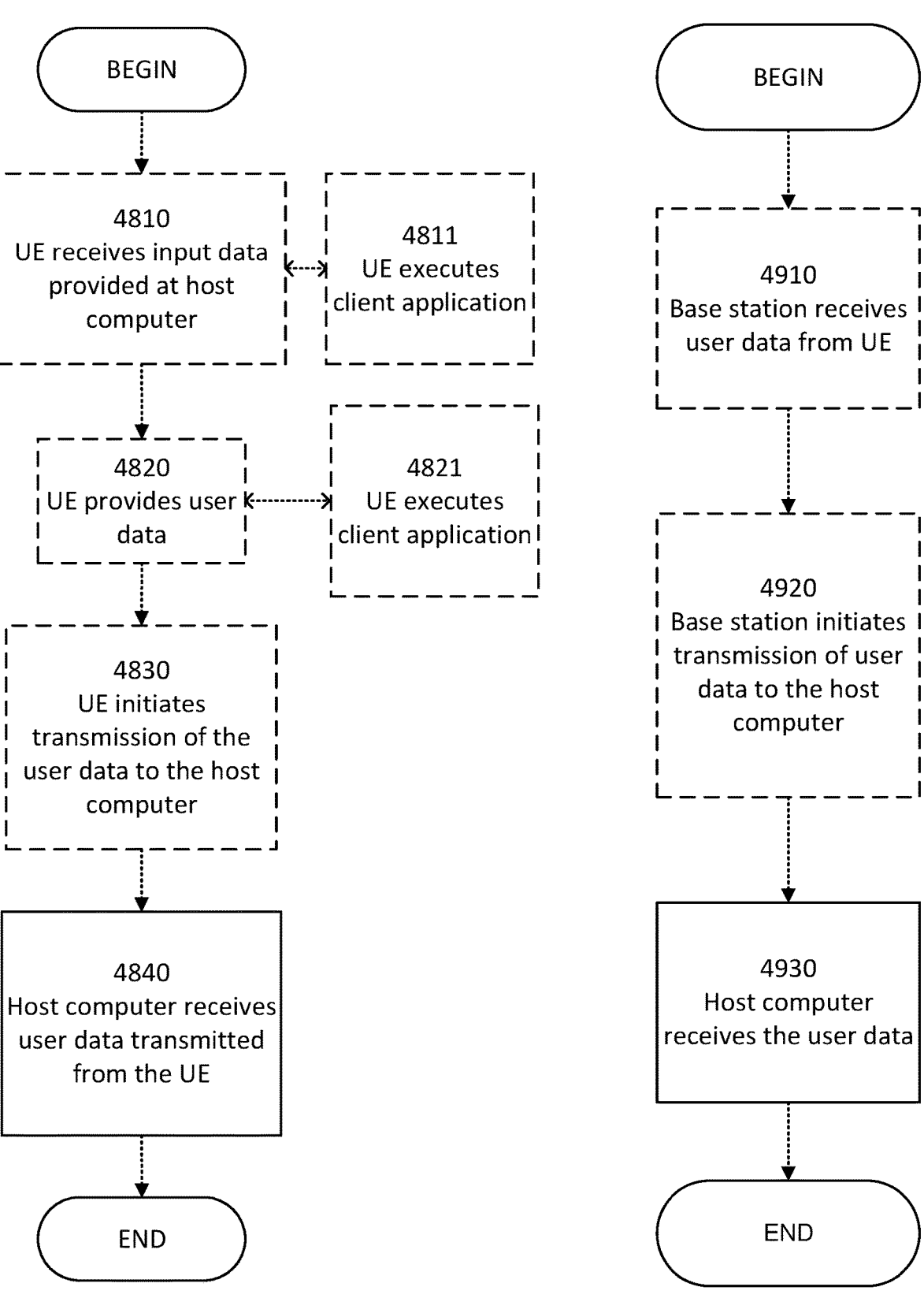
FIG. 32 is a block diagram of methods implemented in a communication system including a host computer, a base station and a user equipment in accordance with some embodiments.
FIG. 33 is a block diagram of methods implemented in a communication system including a host computer, a base station and a user equipment in accordance with some embodiments.

FIG. 32 illustrates methods implemented in a communication system including a host computer, a base station and a user equipment in accordance with some embodiments FIG. 32 is a flowchart illustrating a method implemented in a communication system, in accordance with one embodiment. The communication system includes a host computer, a base station and a UE which may be those described with reference to FIGS. 18-19. For simplicity of the present disclosure, only drawing references to FIG. 32 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 33 illustrates methods implemented in a communication system including a host computer, a base station and a user equipment in accordance with some embodiments FIG. 33 is a flowchart illustrating a method implemented in a communication system, in accordance with one embodiment. The communication system includes a host computer, a base station and a UE which may be those described with reference to FIGS. 28-29. For simplicity of the present disclosure, only drawing references to FIG. 33 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating an entity in a communications network wherein the communications network includes a network node, the method comprising:
   determining a margin from a predetermined plurality of potential margins, each potential margin of the plurality of potential margins being a potential maximum margin of timing error difference between two measurements based on positioning related reference signals or transmissions of positioning related reference signals;
   transmitting an indication of the margin to the network node;
   performing an action, wherein the action comprises performing a positioning measurement, transmitting a sounding reference signal (SRS), or transmitting a positioning reference signal (PRS); and
   determining a timing error group (TEG) associated with the action based on the margin.

2. The method of claim 1, wherein determining the margin comprises:
   transmitting an indication of at least one potential margin to the network node; receiving an indication of a subset of the at least one potential margin; and
   determining the margin from the subset of the at least one potential margin.

3. The method of claim 1, wherein the predetermined plurality of potential margins comprises a list of potential margins specified in a radio access technology (RAT) standard followed by the communications network.

4. The method of claim 1, wherein performing the action comprises at least one of:

performing a first measurement associated with a channel between a communication device and the communications network;

performing a transmission of a first SRS from a communication device to the communications network;

performing a transmission of a first PRS from a node in the communication network to a communication device, and wherein determining the TEG associated with the action comprises at least one of:

determining whether a timing error difference between the first measurement and a second measurement is within the margin;

determining whether a timing error difference between the first SRS transmission and a second SRS transmission is within the margin; and determining whether a timing error difference between the first PRS transmission and a second PRS transmission is within the margin.

5. The method of claim 1, wherein the network node comprises a core network (CN) node configured to provide a location management function (LMF), and wherein the entity comprises at least one of:

a communication device; and a radio access network (RAN) node.

6. The method of claim 1, wherein performing the action comprises performing a first action and a second action, the method further comprising:

determining whether a difference between a first time associated with when the first action was performed and a second time associated with when the second action was performed exceeds a threshold; and determining a timing error group (TEG) associated with the second action based on whether the difference exceeds the threshold.

7. The method of claim 6, wherein the first time is indicated in a first timestamp associated with the first action, and wherein the second time is indicated in a second timestamp associated with the second action.

8. The method of claim 1, wherein performing the action comprises performing a first action and a second action, the method further comprising:

determining a temporal timing error group (TEG) index associated with the second action; and transmitting a report to the network node, the report indicating that the second action is associated with the temporal TEG index.

9. The method of claim 8, wherein the entity is a communication device, wherein performing the second action comprises performing a positioning measurement, wherein determining the temporal TEG index associated with the second action comprises associating the positioning measurement with the temporal TEG index, and wherein transmitting the report comprises transmitting a positioning measurement report to the network node including the positioning measurement and the temporal TEG index.

10. The method of claim 8, wherein the entity is a communication device, wherein performing the second action comprises transmitting the SRS to the network node, wherein determining the temporal TEG index associated with the second action comprises associating a transmission of the SRS with the temporal TEG index, and wherein transmitting the report comprises transmitting a SRS transmission report to the network node, the SRS transmission report indicating that the SRS transmission is associated with the temporal TEG index.

11. The method of claim 8, wherein the entity is a radio access network (RAN) node, and wherein the network node is a core network (CN) node configured to perform a location management function (LMF), wherein performing the second action comprises transmitting a downlink positioning reference signal (DL-PRS) to a communication device, wherein determining the temporal TEG index comprises determining the temporal TEG index associated with transmission of the DL-PRS, and wherein transmitting the report comprises transmitting the report to the CN node via a New Radio Positioning Protocol A (NRPPa) interface.

12. The method of claim 8, wherein the temporal TEG index comprises one temporal TEG index of a plurality of temporal TEG indices, and wherein determining the temporal TEG index comprises determining a temporal TEG index of the plurality of temporal TEG indices for the first action and the second action, wherein determining the temporal TEG index for the first action and the second action comprises determining that the first action and the second action are associated with a common temporal TEG index of the plurality of temporal TEG indices based on a maximum timing error difference between the first action and the second action being evaluated as smaller than a margin threshold value.

13. The method of claim 1, further comprising:

receiving a request for timing error group (TEG) reporting capabilities from the network node; and responsive to receiving the request, transmitting TEG reporting capabilities to the network node, the TEG reporting capabilities indicating that the entity is capable of determining a temporal TEG index associated with the action and reporting that the temporal TEG index is associated with the action to the network node.

14. A method of operating a network node in a communications network that includes an entity, the method comprising:

receiving an indication of a margin from the entity, wherein the margin is from a predetermined plurality of potential margins, each potential margin of the plurality of potential margins being a potential maximum margin of timing error difference between two measurements based on positioning related reference signals or transmissions of positioning related reference signals;

receiving a report from the entity, the report indicating that an action performed by the entity is associated with a temporal timing error group (TEG) index, wherein the action comprises performing a positioning measurement, transmitting a sounding reference signal (SRS), or transmitting a positioning reference signal (PRS); and determining a position of a communication device based on the temporal TEG index associated with the action.

15. The method of claim 14, wherein the entity is the communication device, wherein the action comprises at least one of:

the positioning measurement performed by the communication device; and the SRS transmission transmitted by the communication device, and wherein receiving the report comprises at least one of:

receiving a positioning measurement report from the communication device including the positioning measurement and the temporal TEG index; and receiving an SRS transmission report from the communication device, the SRS transmission report indicating that the SRS transmission is associated with the temporal TEG index.

16. The method of claim 14, wherein the entity is a radio access network (RAN) node, wherein the network node is a core network (CN) node configured to perform a location management function (LMF), wherein the action comprises a downlink positioning reference signal (DL-PRS) transmission by the RAN node to the communication device, and wherein receiving the report comprises receiving a DL-PRS transmission report from the RAN node, the DL-PRS transmission report indicating that the DL-PRS transmission is associated with the temporal TEG index.

17. The method of claim 14, further comprising:

transmitting configuration parameters to the entity, the configuration parameters including at least one of:

a margin indicating a maximum timing error difference between two actions considered to be associated with a common temporal TEG index; and a request that the entity associate the temporal TEG index with the action and report the temporal TEG index to the network node.

18. The method of claim 14, wherein the temporal TEG index comprises a first temporal TEG index of a plurality of temporal TEG indices, wherein the action comprises a first action of a plurality of actions, and wherein receiving the report comprises receiving the report indicating a temporal TEG index associated with each action of the plurality of actions, wherein determining the position of the communication device comprises determining whether the first action of the plurality of actions and a second action of the plurality of actions are part of a common TEG based on a first temporal TEG index associated with the first action and a second temporal TEG index associated with the second action, wherein determining whether the first action and the second action are part of the common TEG comprises determining that the first action and the second action are part of the common TEG based on determining that the first action and the second action:

share a common spatial TEG index;

share a common temporal TEG index;

share a common frequency TEG index; and that no other action has been reported with the common spatial TEG index, the common temporal TEG index, the common frequency TEG index, and with a timestamp in a time interval between timestamps associated with the first action and the second action.

19. The method of claim 14, further comprising:

transmitting a request for TEG reporting capabilities to the entity; and responsive to transmitting the request, receiving TEG reporting capabilities from the entity, the TEG reporting capabilities indicating that the entity is capable of determining a temporal TEG index associated with an action and reporting that the temporal TEG index is associated with the action to the network node.

* * * * *